United States Patent
Taherzadeh Boroujeni et al.

(10) Patent No.: US 12,207,109 B2
(45) Date of Patent: Jan. 21, 2025

(54) TECHNIQUES FOR PDCCH MONITORING AGGREGATION

(71) Applicant: QUALCOMM INCORPORATED, San Diego, CA (US)

(72) Inventors: Mahmoud Taherzadeh Boroujeni, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 17/357,387

(22) Filed: Jun. 24, 2021

(65) Prior Publication Data

US 2021/0409983 A1    Dec. 30, 2021

Related U.S. Application Data

(60) Provisional application No. 63/045,572, filed on Jun. 29, 2020, provisional application No. 63/044,866, (Continued)

(51) Int. Cl.
*H04W 24/08* (2009.01)
*H04W 72/04* (2023.01)
(Continued)

(52) U.S. Cl.
CPC ....... *H04W 24/08* (2013.01); *H04W 72/0446* (2013.01); *H04W 72/0453* (2013.01); *H04W 72/23* (2023.01)

(58) Field of Classification Search
CPC . H04W 24/08; H04W 72/23; H04W 72/0446; H04W 72/0453
See application file for complete search history.

(56) References Cited

U.S. PATENT DOCUMENTS

2019/0182807 A1    6/2019  Panteleev et al.
2022/0394687 A1*  12/2022  Xu .................. H04L 5/0091

FOREIGN PATENT DOCUMENTS

CN          109802758 A       5/2019
WO    WO-2021159308 A1 *    8/2021  ............... H04L 1/08

OTHER PUBLICATIONS

Spreadtrum Communications, R1-1813064, 'Discussion on PDCCH enhancement on URLLC', 3GPP TSG RAN WG1 Meeting #95, Nov. 12-16, 2018, pp. 1-4. (Year: 2018).*

(Continued)

*Primary Examiner* — Melvin C Marcelo
(74) *Attorney, Agent, or Firm* — Haynes and Boone, LLP/Qualcomm Incorporated

(57) ABSTRACT

Wireless communications systems and methods related to a downlink search space with or without PDCCH monitoring aggregation in a wireless communication network are provided. A UE receives a monitoring configuration from a BS including a repetition of DCI over a plurality of PDCCH monitoring occasions of a search space. The monitoring configuration indicates one or more forms of diversity between PDCCH monitoring occasions. Diversity may be achieved, for example, by a CORESET frequency allocation difference, a PDCCH monitoring occasion frequency resource allocation difference, and/or different hashing functions for the CCE index of PDCCH monitoring occasions within a CORESET. Additional diversity is possible by using different beams and other methods. When activated either explicitly or implicitly, UE monitors for PDCCH transmissions from the first device utilizing the configured PDCCH monitoring aggregation.

28 Claims, 18 Drawing Sheets

Related U.S. Application Data filed on Jun. 26, 2020, provisional application No. 63/044,752, filed on Jun. 26, 2020.

(51) Int. Cl.
  *H04W 72/0446* (2023.01)
  *H04W 72/0453* (2023.01)
  *H04W 72/23* (2023.01)

(56) References Cited

OTHER PUBLICATIONS

Kazuki Takeda et al., 'Understanding the Heart of the 5G Air Interface: An Overview of Physical Downlink Control Channel for 5G New Radio (NR)', Networking and Internet Architecture, Oct. 3, 2019, pp. 1-10. (Year: 2019).*
InterDigital Inc: "Evaluation of PDCCH Repetition for URLLC", 3GPP Draft, R1-1804853, 3GPP TSG RAN WG1 Meeting #92bis, Evaluation of PDCCH Repetition for URLLC, 3rd Generation Partnership Project, F-06921 Cedex, France , vol. RAN WG1, No. Sanya, China, Apr. 16, 2018-Apr. 20, 2018, Apr. 15, 2018, XP051427116, XP051414205, 8 Pages, Retrieved from the Internet: URL:http://www.3gpp.org/ftp/Meetings%5F3GPP%5FSYNC/RAN1/Docs/, http://www.3gpp.org/ftp/tsg%5Fran/WG1%5FRL1/TSGR1%5F92b/Docs, [retrieved on Apr. 15, 2018].
International Search Report and Written Opinion—PCT/US2021/039194—ISA/EPO—Nov. 2, 2021.
Mediatek Inc: "On PDCCH Repetition for URLLC", 3GPP TSG RAN WG1 Meeting #92, R1-1801666, Athens, Greece, Feb. 26, 2018-Mar. 2, 2018, Feb. 17, 2018, pp. 1-5.

* cited by examiner

1710 — Receive a monitoring configuration, wherein the monitoring configuration includes repetition of downlink control information (DCI) over a plurality of physical downlink control channel (PDCCH) monitoring occasions of a search space, wherein the monitoring configuration indicates a plurality of hashing functions for identifying one or more control channel element (CCE) indexes of a set of PDCCH candidates of the search space, wherein a hashing function of the plurality of hashing functions is dependent on at least one of a position of a corresponding PDCCH monitoring occasion of the plurality of PDCCH monitoring occasions, an index associated with the corresponding PDCCH monitoring occasion, or a combination thereof 1720 — Monitor for the DCI in the search space associated with the plurality of PDCCH monitoring occasions based at least in part on the hashing function

FIG. 17

TECHNIQUES FOR PDCCH MONITORING AGGREGATION

CROSS-REFERENCE TO RELATED APPLICATIONS

The present application claims priority to and the benefit of U.S. Provisional Patent Application No. 63/044,752, filed Jun. 26, 2020 and titled "Techniques for PDCCH Monitoring Aggregation," U.S. Provisional Patent Application No. 63/044,866, filed Jun. 26, 2020 and titled "Techniques for Hashing Function Perturbation for Physical Downlink Control Channel Monitoring Aggregation," and U.S. Provisional Patent Application No. 63/045,572, filed Jun. 29, 2020 and titled "Techniques for Physical Downlink Control Channel Monitoring With Frequency Diversity," the disclosure of each of which is incorporated by reference herein in its entirety as if fully set forth below in its entirety and for all applicable purposes.

TECHNICAL FIELD

This application relates to wireless communication systems, and more particularly to improved downlink control channel communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a search space refers to a time-frequency region in a transmission slot where downlink (DL) control information is carried. The search spaces are typically located at the beginning of a transmission slot. Under certain conditions, the DL control channel may be unreliable, which can affect the robustness of the network. Thus, there is a need to provide a way to ensure that DL control information is transmitted in a more robust way that can adapt to changing channel quality, such as by improving one or more frequency characteristics of the channel.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE), a monitoring configuration specifying a first control resource set (CORESET) and a second CORESET corresponding to respective monitoring occasions from among a plurality of monitoring occasions, the first and second CORESETs being different from each other. The method further includes monitoring, by the UE based on the monitoring configuration, a search space comprising the plurality of monitoring occasions for a physical downlink control channel (PDCCH) transmission.

In an additional aspect of the disclosure, a method of wireless communication includes transmitting, by a base station (BS), a monitoring configuration specifying a first control resource set (CORESET) and a second CORESET corresponding to respective monitoring occasions from among a plurality of monitoring occasions, the first and second CORESETs being different from each other. The method further includes indicating, by the BS to the UE based on the monitoring configuration, to begin monitoring a search space comprising the plurality of monitoring occasions for a physical downlink control channel (PDCCH) transmission. The method further includes transmitting, by the BS to the UE, the PDCCH transmission in at least one of the first CORESET and the second CORESET.

In an additional aspect of the disclosure, a first wireless communications device includes a transceiver configured to receive a monitoring configuration from a second wireless communications device specifying a first control resource set (CORESET) and a second CORESET corresponding to respective monitoring occasions from among a plurality of monitoring occasions, the first and second CORESETs being different from each other. The wireless communications device further includes a transceiver configured to receive a monitoring configuration from a second wireless communications device specifying a first control resource set (CORESET) and a second CORESET corresponding to respective monitoring occasions from among a plurality of monitoring occasions, the first and second CORESETs being different from each other.

In an additional aspect of the disclosure, a first wireless communications device includes a transceiver configured to transmit a monitoring configuration to a second wireless communications device specifying a first control resource set (CORESET) and a second CORESET corresponding to respective monitoring occasions from among a plurality of monitoring occasions, the first and second CORESETs being different from each other. The transceiver is further configured to indicate to the second wireless communications device, based on the monitoring configuration, to begin monitoring a search space comprising the plurality of monitoring occasions for a physical downlink control channel (PDCCH) transmission. The transceiver is further configured to transmit the PDCCH transmission in at least one of the first CORESET and the second CORESET.

In an additional aspect of the disclosure, a non-transitory computer-readable medium having program code recorded thereon, the program code includes code for causing a first wireless communications device to receive a monitoring configuration from a second wireless communications device specifying a first control resource set (CORESET) and a second CORESET corresponding to respective monitoring occasions from among a plurality of monitoring occasions, the first and second CORESETs being different from each other. The non-transitory computer-readable medium further comprising code for causing the first wireless communications device to monitor, based on the monitoring configuration, a search space comprising the plurality of monitoring occasions for a physical downlink control channel (PDCCH) transmission.

In an additional aspect of the disclosure, a non-transitory computer-readable medium having program code recorded thereon, the program code includes code for causing a first wireless communications device to transmit to a second wireless communications device a monitoring configuration specifying a first control resource set (CORESET) and a second CORESET corresponding to respective monitoring occasions from among a plurality of monitoring occasions, the first and second CORESETs being different from each other. The non-transitory computer-readable medium further comprises code for causing the first wireless communications device to indicate, to the second wireless communications device based on the monitoring configuration, to begin monitoring a search space comprising the plurality of monitoring occasions for a physical downlink control channel (PDCCH) transmission. The non-transitory computer-readable medium further comprises code for causing the first wireless communications device to transmit the PDCCH transmission in at least one of the first CORESET and the second CORESET.

In an additional aspect of the disclosure, a first wireless communications device comprises means for receiving a monitoring configuration from a second wireless communications device specifying a first control resource set (CORESET) and a second CORESET corresponding to respective monitoring occasions from among a plurality of monitoring occasions, the first and second CORESETs being different from each other. The first wireless communications device further comprises means for monitoring, based on the monitoring configuration, a search space comprising the plurality of monitoring occasions for a physical downlink control channel (PDCCH) transmission.

In an additional aspect of the disclosure, a first wireless communications device comprises means for transmitting a monitoring configuration to a second wireless communications device specifying a first control resource set (CORESET) and a second CORESET corresponding to respective monitoring occasions from among a plurality of monitoring occasions, the first and second CORESETs being different from each other. The first wireless communications device further comprises means for indicating to the second wireless communications device, based on the monitoring configuration, to begin monitoring a search space comprising the plurality of monitoring occasions for a physical downlink control channel (PDCCH) transmission. The first wireless communications device further comprises means for transmitting to the second wireless communications device the PDCCH transmission in at least one of the first CORESET and the second CORESET.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 17 illustrates a flow diagram of a wireless communication method according to some embodiments of the present disclosure.

DETAILED DESCRIPTION

Figure 1:
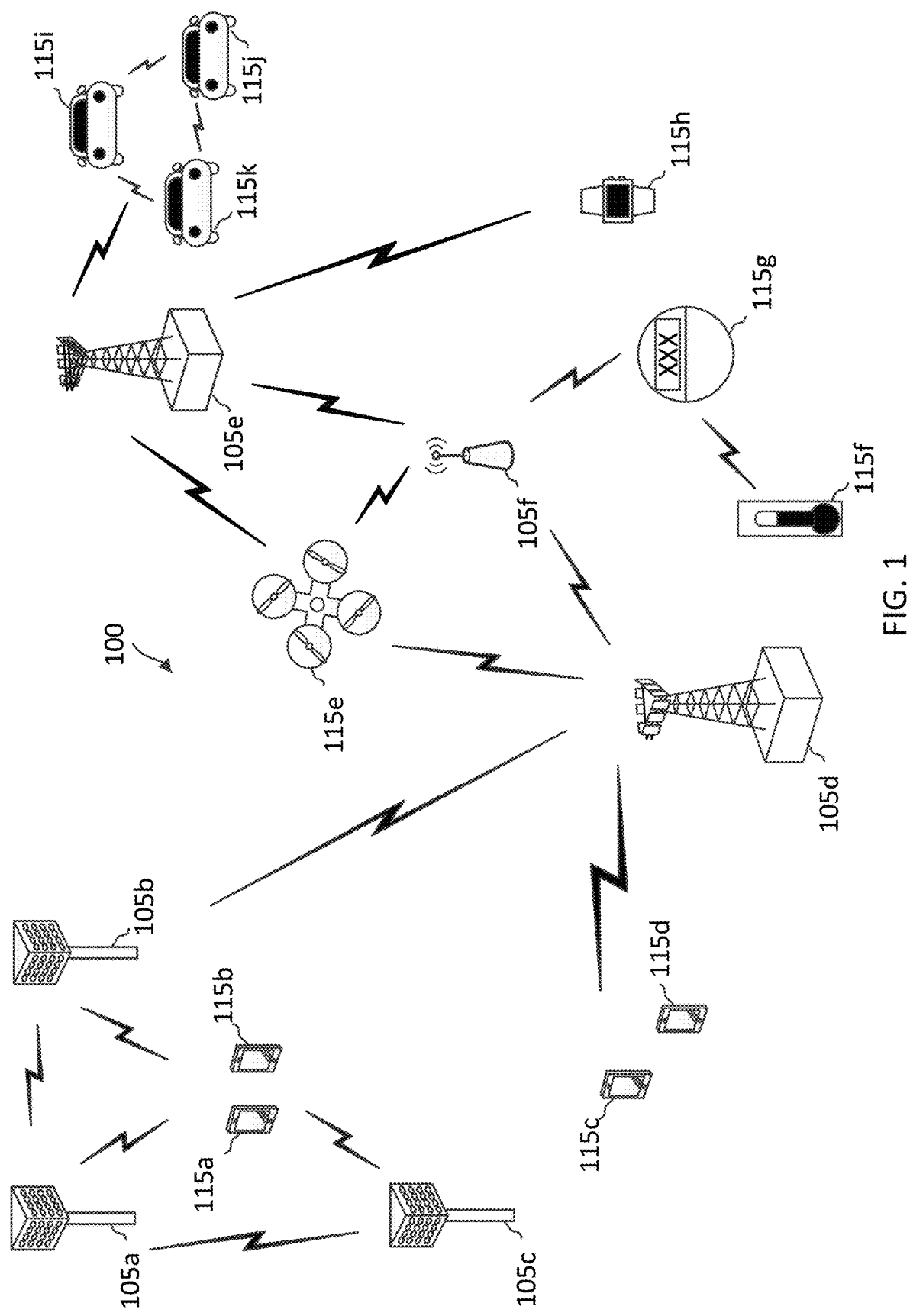
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, orthogonal frequency division multiplexing (OFDM) and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Communications can be in the form of radio frames. A radio frame may be divided into a plurality of subframe, which can be divided into one or more slots. Each slot may be further divided into mini-slots. At the smallest level (e.g., within a slot), a resource element (RE) comprises a single subcarrier in the frequency domain, and a single OFDM symbol in the time domain. A resource element group (REG) may be comprised of a number of REs (e.g., 12) within a single OFDM symbol. A control channel element (CCE) comprises a group of REGs.

In NR, PDCCH is transmitted over a Control Resource Set (CORESET). A CORESET is a set of CCEs which is used to carry PDCCH transmissions, for example 1, 2, 4, 8, or 16 CCEs. A CORESET is generally limited to span less than the full frequency range of a radio frame. Each CORESET has an associated CCE to REG mapping. Frequencies within a CORESET can be contiguous or non-contiguous. A CORESET may span one or more OFDM symbol time periods.

A set of potential PDCCH candidates is called a search space and is associated with a CORESET and can have configurable monitoring occasions defined. A BS may configure a UE with one or more search spaces for PDCCH monitoring based on the predefined CORESET. The UE may perform blind decoding in the search spaces to search for DL control information from the BS. For example, a BS may configure a UE with the BWPs, the CORESETS, and/or the PDCCH search spaces via RRC configurations.

The present application describes mechanisms for providing multiple monitoring occasions associated with different CORESETs within a search space. The CORESETs associated with different monitoring occasions may have different frequency allocation, different CCE-to-REG mapping, different REG bundling, and/or different transmission configuration indicator (TCI) states (i.e. associated with different beams). Through a mechanism such as RRC configuration, the multiple CORESETs may be preconfigured and associated with different monitoring occasions of a search space.

A multi-CORESET monitoring may be activated in a number of ways. For example, multi-CORESET monitoring can be through semi-static configuration like RRC configuration, and/or dynamic configuration such as MAC CE, UE-specific downlink control information (DCI), or group-common DCI. Additionally, multi-CORESET monitoring may be activated implicitly when some other criteria is met, for example the activation of PDCCH monitoring aggregation. As used herein, PDCCH monitoring aggregation refers to where a single PDCCH is repeated over multiple CORE-SETs to create a larger virtual CORESET.

The applicability of multi-CORESET monitoring, with or without monitoring aggregation, may be conditioned on certain parameters. For example, multi-CORESET monitoring may be conditioned on the size of the CORESET, either in terms of number of RBs and/or OFDM symbols. As another example, it may be conditioned on the frequency range available. As a further example, the multi-CORESET monitoring may be conditioned on subcarrier spacing. As another example, it may be conditioned on the type of search space (e.g. UE-specific vs common search space). These are just a few examples. The multi-CORESET may be conditioned upon any one or more of such examples (e.g., a subset or all of them).

Aspects of the present disclosure can provide several benefits. For example, configuring a UE to monitor for PDCCH where the CORESETs cover different frequency ranges can provide frequency diversity. Such frequency diversity can help make the communication more robust, as any frequency-dependent weakness in the channel could be mitigated. Similarly, differences in CCE-to-REG mapping or REG bundling can provide diversity to the signals. By varying the TCI state (and thereby the associated beam) between CORESETs, beam diversity can alternatively and/or also be introduced. Beam diversity can increase the robustness of transmitting PDCCH to a UE. In the case where PDCCH monitoring aggregation is used together with multi-CORESET monitoring, further improvements can be realized. By aggregating repetitions of the same PDCCH over CORESETs with different parameters, that PDCCH transmission is more robust with more power.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. As noted above, the communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. Control information, such as PDCCH etc., has been discussed above and will be described further below with respect to embodiments of the present disclosure. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. In an example, the BS 105 may configure the UE 115 with the BWPs, the CORESETS, and/or the PDCCH search spaces via RRC configurations. Mechanisms for configuring search spaces are described in greater detail herein.

In some aspects, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) in the shared channel by performing a CAT4 LBT. A CAT4 LBT refers to an LBT with a random backoff and a variable contention window. Upon passing the LBT, the BS 105 may schedule one or more UEs 115 for DL communications and/or UL communications within the acquired COT.

According to embodiments of the present disclosure, a BS 105 may configure a UE 115 with multiple CORESETs with PDCCH search spaces for PDCCH monitoring. The different CORESETs may cover different frequency ranges, have different CCE-to-REG mapping or REG bundling, different TCI states (and thereby different beams), or some combination of these variations. Mechanisms for configuring (and using) different CORESETs are described in greater detail herein.

Figure 2:
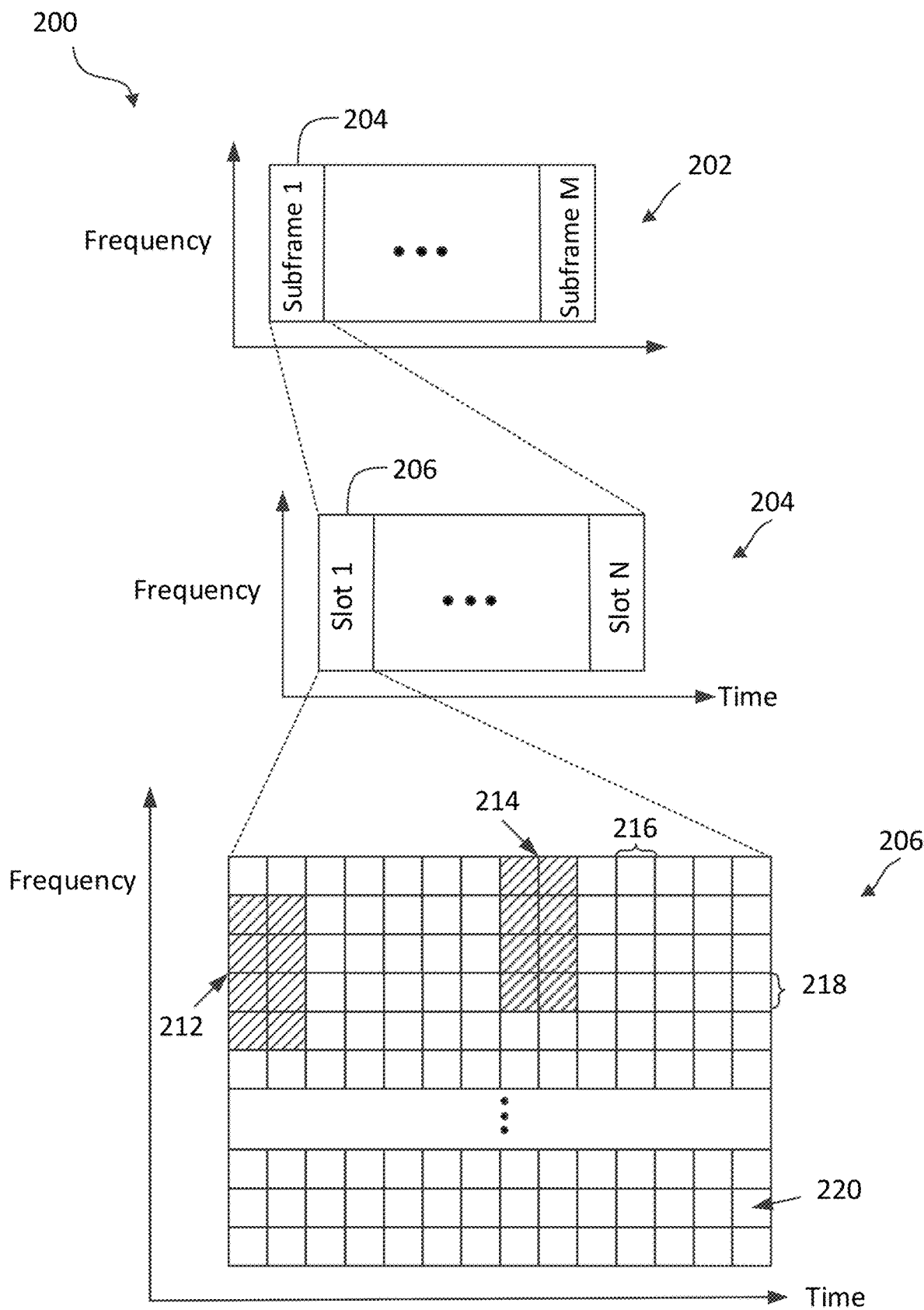
FIG. 2 illustrates a transmission frame for a communication network according to some embodiments of the present disclosure.

FIG. 2 is a timing diagram illustrating a transmission frame structure 200 according to some embodiments of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units and the y-axes represent frequency in some arbitrary units. The transmission frame structure 200 includes a radio frame 202. The duration of the radio frame 202 may vary depending on the embodiments. In an example, the radio frame 202 may have a duration of about ten milliseconds. The radio frame 202 includes M number of subframes 204, where M may be any suitable positive integer. In an example, M may be about 10.

Each subframe 204 may contain N slots 206, where N is any suitable positive number including 1. Each slot 206 includes a number of subcarriers 218 in frequency and a number of symbols 216 in time. The number of subcarriers 218 and/or the number of symbols 216 in a slot 206 may vary depending on the embodiments, for example, based on the channel bandwidth, the subcarrier spacing (SCS), and/or the cyclic prefix (CP) mode. One subcarrier 218 in frequency and one symbol 216 in time forms one resource element (RE) 220 for transmission.

A BS (e.g., BS 105 in FIG. 1) may schedule a UE (e.g., UE 115 in FIG. 1) for UL and/or DL communications at a time-granularity of slots 206. A BS 105 may schedule a UE 115 to monitor for PDCCH transmissions by instantiating a search space associated with a CORESET 212. The search space may also be instantiated with associated CORESET 214. Thus, as illustrated in the example of FIG. 2, there are two CORESETs, and therefore two monitoring occasions, within the slot 206 that are part of the search space the UE 115 monitors for control information from the BS 105.

While FIG. 2 illustrates two CORESETs, 212 and 214, for purposes of simplicity of illustration and discussion, it will be recognized that embodiments of the present disclosure may scale to many more CORESETs, for example, about 3, 4 or more. Each CORESET may include a set of resources spanning a certain number of subcarriers 218 and a number of symbols 216 (e.g., about 1, 2, or 3) within a slot 206. As an alternative to multiple different CORESETs within a slot 206, one or more of the many CORESETs may be in a different slot than the others. Each CORESET has an associated control channel element (CCE) to resource element group (REG) mapping. A REG may include a group of REs 220. The CCE defines how DL control channel data may be transmitted.

A BS 105 may configure a UE 115 with one or more search spaces by associating a CORESET 212 with a starting position (e.g., a starting slot 206), a symbol 216 location within a slot 206, a periodicity or a time pattern, and candidate mapping rules. For examples, a search space may include a set of candidates mapped to CCEs with aggregation levels of 1, 2, 4, 8, and/or 12 CCEs. As an example, a search space may include the CORESET 212 starting at the first symbol 216 indexed within a starting slot 206. The search space may also include the CORESET 214 starting at a later symbol index within the starting slot 206. The exemplary search space may have a periodicity of about five slots and may have candidates at aggregation levels of 1, 2, 4, and/or 8.

The UE 115 may perform blind decoding in the search spaces to search for DL control information (e.g., slot format information and/or scheduling information) from the BS. In some examples, the UE may search a subset of the search spaces based on certain rules, for example, associated with the UE's channel estimation and/or blind decoding capabilities. One such example of DL control information the UE 115 may be blind decoding for is a PDCCH from the BS 105.

As shown in FIG. 2, CORESET 212 and CORESET 214 may be at different frequencies from each other. The CORESETs can be non-contiguous as shown, or they may be contiguous. The frequency ranges of CORESET 212 and CORESET 214 may overlap or not (e.g., as illustrated in FIG. 2, the frequency ranges partially overlap, and therefore are different from each other). In some aspects, the frequency offset between the CORESETs is a multiple of six RBs, or some other offset. According to the example of FIG. 2, each of CORESET 212 and CORESET 214 may carry a different PDCCH transmission (or none at all, though part of the search space for the UE 115). CORESET 212 and CORESET 214 can have other characteristics which are different from each other than just frequency (or instead of frequency). For example, they can differ in CCE-to-REG mapping and/or REG bundling. Or, they can also be associated with different TCI states, thereby being associated with different beams. In addition, the CCE index of a PDCCH monitoring occasion may be different across CORESETs as is discussed in more detail with respect to FIG. 12. Other forms of diversity between CORESETs could be achieved as well, including some combination of differing characteristics (such as all of the above differences together or a subset thereof).

By adding diversity between the CORESETs, problems with transmission channels associated with those features may be mitigated. FIG. 2 shows two different CORESETs, but there may be more than two CORESETs, each with either the same or different characteristics in any combination.

Figure 3:
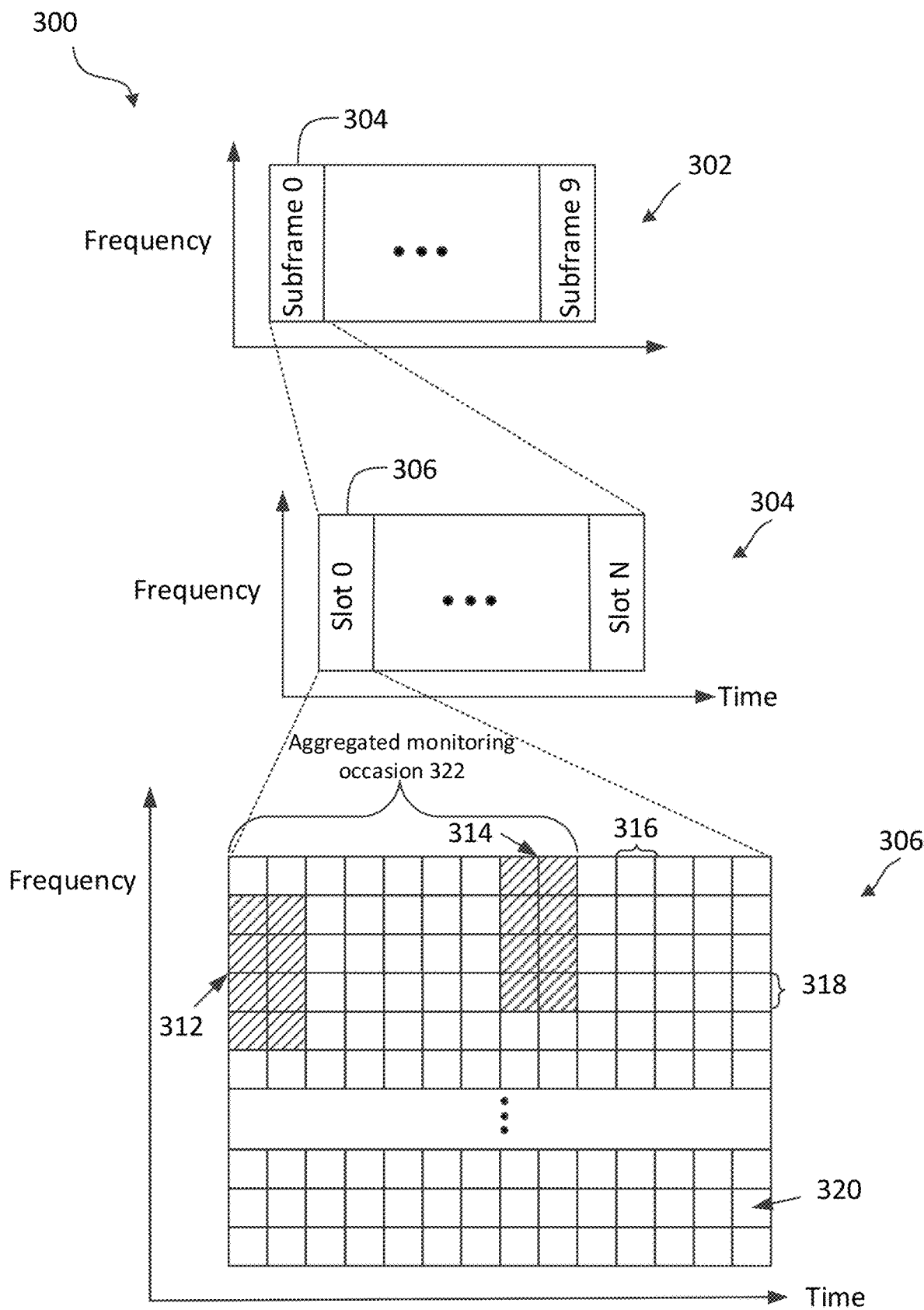
FIG. 3 illustrates a transmission frame for a communication network according to some embodiments of the present disclosure.

FIG. 3 illustrates a transmission frame structure 300 similar to transmission frame structure 200 in FIG. 2. Radio frame 302, subframes 304, and slots 306 are similar to radio frame 202, subframes 204, and slots 206 respectively. A RE 320 is comprised of a single OFDM symbol 316 and a single subcarrier 318. CORESET 312 and CORESET 314 are also similar to CORESET 212 and CORESET 214 of FIG. 2 respectively. Thus, discussion will focus on additional aspects illustrated in FIG. 3.

In FIG. 3, CORESET 312 and CORESET 314 are part of an aggregated monitoring occasion 322. This means that CORESET 312 and CORESET 314 carry the same PDCCH (i.e., multiple repetitions of the PDCCH over an aggregated set of multiple monitoring occasions associated with the different CORESETs 312 and 314). Aggregation of monitoring occasions alleviates potential issues with beam diversity by transmitting the same PDCCH over the aggregated set of multiple monitoring occasions. For example, related U.S. Provisional Application 64/044,752 discusses more details relating to monitoring occasion aggregation in general, and is incorporated by reference herein in its entirety as though set forth fully herein.

According to embodiments of the present disclosure, additional diversity achieved by making the CORESETs 312 and 314 different from each other in some way, such as frequency, CCE-to-REG mapping, REG bundling, TCI states, or some combination of these or other CORESET characteristics. The CORESETs may be either contiguous, or non-contiguous. Additionally, there may be more than two CORESETs aggregated, each with either the same or different characteristics from each other in any combination. By adding diversity to the characteristics of the CORESETs, a more robust network may be realized. The CORESETs may be either contiguous, or non-contiguous. Additionally, there may be more than two CORESETs aggregated, each with either the same or different characteristics from each other in any combination. Further details will be discussed below.

In some aspects, a UE 115 receives a monitoring configuration (or a frequency diversity configuration) which includes an indication of a frequency allocation of a CORESET associated with the search space such as CORESET 314. The frequency allocation of the CORESET may indicate the frequency offset. In some aspects, the frequency offset may include a multiple of six resource blocks (RBs).

In some aspects, as shown, the first CORESET 312 may be associated with a first frequency resource allocation and the second CORESET 314 may be associated with a second frequency resource allocation. The second frequency resource allocation may indicate a frequency offset. In some aspects, the indication of the frequency offset may indicate the frequency offset as a function of an initial symbol of the second CORESET 314 (e.g., as a function of a location of the second CORESET 314 within a slot 306).

In some aspects, the monitoring configuration may indicate a specified number of PDCCH monitoring occasions (or CORESETs) per slot and the frequency offset may be associated with a specified monitoring occasion per slot. For example, the frequency offset may be associated with the second CORESET 314 in each slot. In some aspects, as shown, the frequency diversity configuration may indicate a specified number of CORESETs 312 and 314 per aggregated monitoring occasion 322. The frequency offset may be associated with a specified CORESET 314 per aggregated monitoring occasion 322. For example, the frequency offset may be associated with the second CORESET 314 of the aggregated monitoring occasion 322.

In some aspects, a frequency offset may be associated with a subset of a plurality of CORESETs that contains a second CORESET and at least a third CORESET. For example, in some aspects, the frequency offset may be associated with the second and third CORESETs of a plurality of CORESETs.

Figure 4:
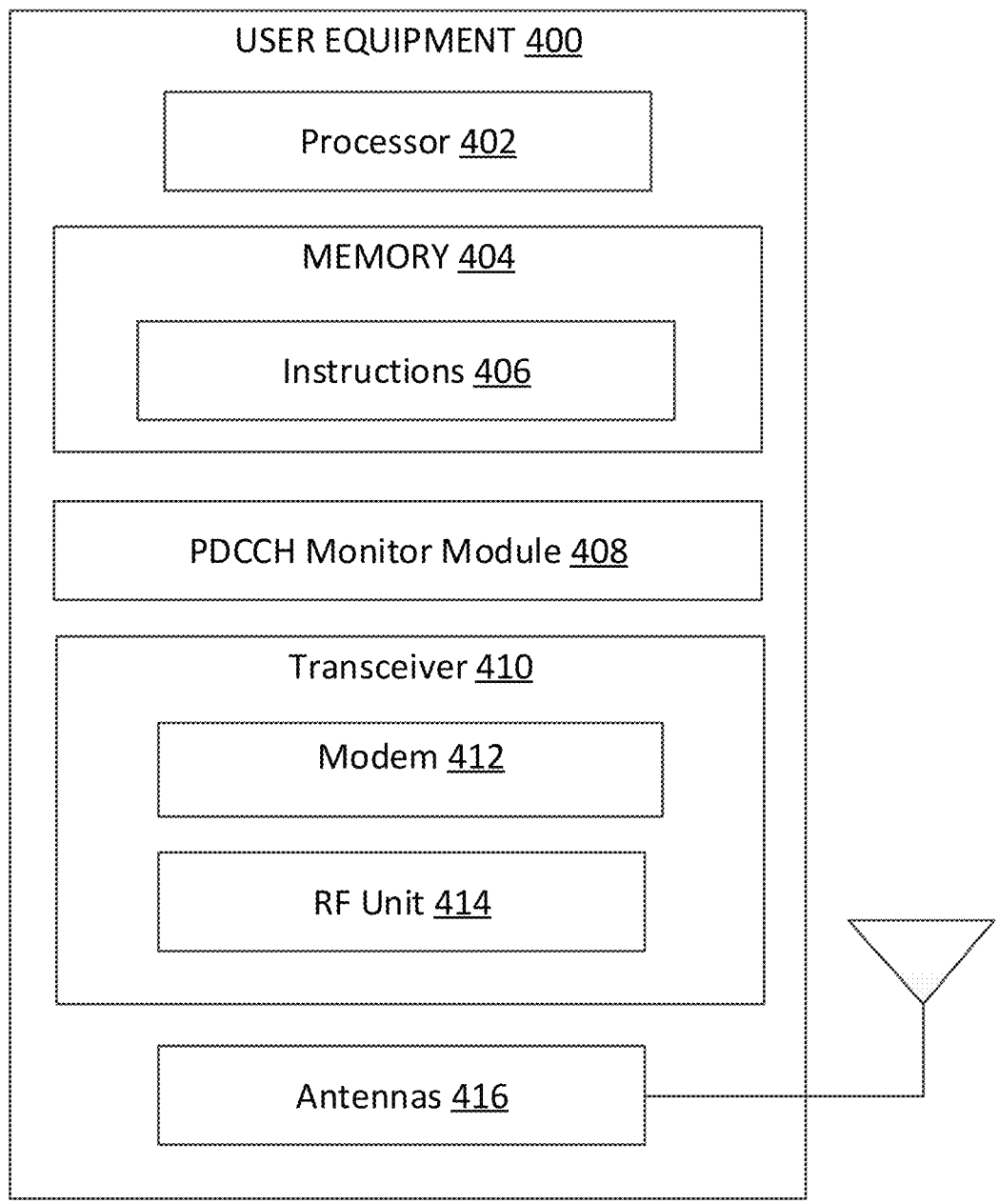
FIG. 4 illustrates a block diagram of a user equipment (UE) according to some embodiments of the present disclosure.

FIG. 4 is a block diagram of an exemplary UE 400 according to embodiments of the present disclosure. The UE 400 may be a UE 115 in the network 100 as discussed above in FIG. 1. As shown, the UE 400 may include a processor 402, a memory 404, a PDCCH monitor module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 2-3 and 6-17. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The PDCCH monitor module 408 may be implemented via hardware, software, or combinations thereof. For example, the PDCCH monitor module 408 may be implemented as a processor, circuit, and/or instructions 406 stored in the memory 404 and executed by the processor 402. In some examples, the PDCCH monitor module 408 can be integrated within the modem subsystem 412. For example, the PDCCH monitor module 408 can be implemented by a combination of software components (e.g., executed by a DSP or a general processor) and hardware components (e.g., logic gates and circuitry) within the modem subsystem 412.

The PDCCH monitor module 408 may be used for various aspects of the present disclosure, for example, aspects of FIGS. 2-3 and 6-18. The PDCCH monitor module 408 is configured to receive a monitoring configuration from a BS (e.g., BS 105 in FIG. 1). The monitoring configuration may indicate multiple CORESETs associated with the same or multiple search spaces. The PDCCH monitor module 408 is further configured to either perform single CORESET PDCCH monitoring, multi-CORESET PDCCH monitoring, or multi-CORESET aggregated monitoring depending on the current state and/or embodiment. In some aspects of the present disclosure, the PDCCH monitor module 408 may be configured to activate multi-CORESET monitoring (different CORESETs) implicitly when PDCCH monitoring occasion aggregation is activated. In other examples, the PDCCH monitor module 408 may be configured to activate multi-CORESET monitoring explicitly in response to an activation message (e.g., via semi-static RRC configuration messaging, or more dynamic MAC CE or DCI messaging).

The monitoring configuration received by the PDCCH monitor module 408 may also include diversity information. For example, the multiple CORESETs as indicated by the monitoring configuration may use different frequency resources, and/or different beams. Additionally, CCE to REG mapping may be different between CORESETs. The monitoring configuration received by PDCCH monitor module 408 may also, or alternatively, indicate a plurality of hashing functions for identifying one or more CCE indexes of a set of PDCCH candidates of the search space, and where a hashing function of the plurality of hashing functions is dependent on at least one of a position of a corresponding PDCCH monitoring occasion of the plurality of PDCCH monitoring occasions, an index associated with the corresponding PDCCH monitoring occasion, or a combination thereof. These may be alternative options or be used together in some combination, such as according to some examples described with respect to additional figures below.

The PDCCH monitor module 408 may include one or more instructions that, when executed by one or more processors of the UE 400, cause the UE 400 to determine that a parameter satisfies a condition. The PDCCH monitor module 408 may determine that the parameter satisfies the condition based at least in part on determining that the parameter satisfies a specified threshold. In some aspects, the parameter may indicate a size of a CORESET associated with a search space, a size of a bandwidth associated with the search space, a frequency range associated with the search space, a subcarrier spacing associated with the search space, a search space type associated with the search space, and/or the like, as described below in connection with FIGS. 13, 14, 15, and 17.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the PDCCH monitor module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices. The transceiver 410 may be further configured to monitor for the DCI in the search space associated with the plurality of PDCCH monitoring occasions based at least in part on a the monitoring configuration and/or hashing function.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

Figure 5:
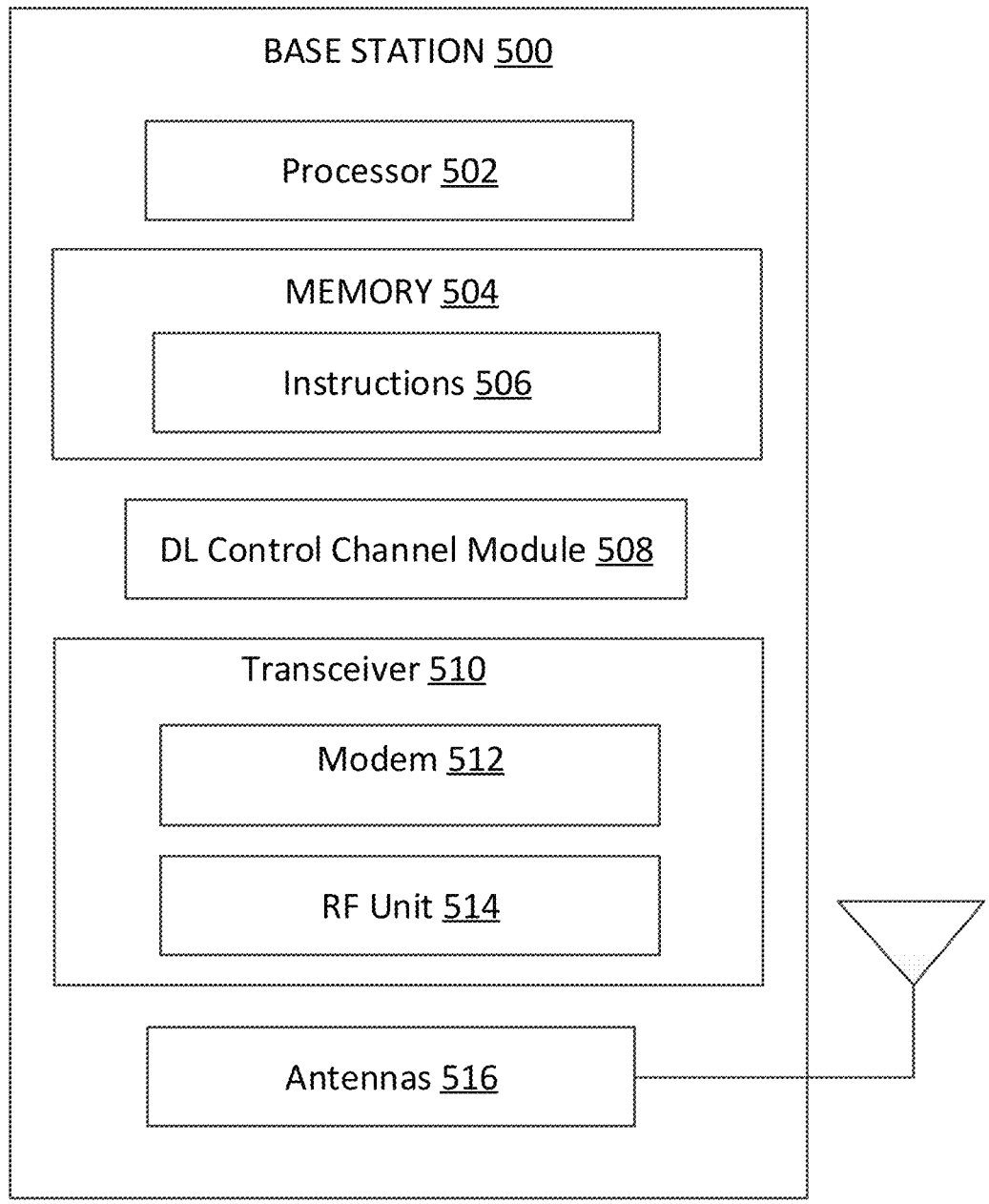
FIG. 5 illustrates a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 as discussed above in FIG. 1. As shown, the BS 500 may include a processor 502, a memory 504, a DL control channel module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-18. Instructions 506 may also be referred to as code, which may be interpreted broadly to include any type of computer-readable statement(s) as discussed above with respect to FIG. 4.

The DL control channel module 508 may be implemented via hardware, software, or combinations thereof. For example, the DL control channel module 508 may be implemented as a processor, circuit, and/or instructions 506 stored in the memory 504 and executed by the processor 502. In some examples, the DL control channel module 508 can be integrated within the modem subsystem 512. For example, the DL control channel module 508 can be implemented by a combination of software components (e.g., executed by a DSP or a general processor) and hardware components (e.g., logic gates and circuitry) within the modem subsystem 512.

The DL control channel module 508 may be used for various aspects of the present disclosure, for example, aspects of FIGS. 2-3 and 6-18. The DL control channel module 508 is configured to transmit a monitoring configuration to a UE (e.g., UE 115 in FIG. 1). The monitoring configuration may indicate multiple CORESETs for the UE 115 to monitor, e.g. within a search space with multiple monitoring occasions. The monitoring configuration may indicate differences between configured CORESETs such that is diversity in either frequency or beams or otherwise. For example, CORESETs may be configured with a frequency offset between them, or with different CCE to REG mappings.

The monitoring configuration may include repetition of downlink control information (DCI) over a plurality of physical downlink control channel (PDCCH) monitoring occasions of a search space, wherein at least two PDCCH monitoring occasions of the plurality of PDCCH monitoring occasions are associated with different frequency resource allocations.

The monitoring configuration may also indicate a plurality of hashing functions for identifying one or more control channel element (CCE) indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof, means for monitoring for the DCI in the search space associated with the plurality of PDCCH monitoring occasions based at least in part on the hashing function, and/or the like. The DL control channel module 508 is further configured to activate multi-CORESET monitoring on the UE either explicitly or implicitly by activating some other aspect such as monitoring occasion aggregation (or, in other embodiments, without monitoring aggregation but by explicit messaging either via RRC configuration, MAC CE, and/or DCI messaging).

In some aspects, base station DL control channel module 508 may include means for transmitting a monitoring configuration to a UE, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof, means for transmitting the DCI in the search space associated with the plurality of PDCCH monitoring occasions based at least in part on the hashing function, and/or the like.

The DL control channel module 508 may include one or more instructions that, when executed by one or more processors of the BS 500, cause the BS 500 to determine that a parameter satisfies a condition. The DL control channel module 508 may determine that the parameter satisfies the condition based at least in part on determining that the parameter satisfies a specified threshold. In some aspects, the parameter may indicate a size of a CORESET associated with a search space, a size of a bandwidth associated with the search space, a frequency range associated with the search space, a subcarrier spacing associated with the search space, a search space type associated with the search space, and/or the like, as described above in connection with FIGS. 13, 14, 15, and 17.

The DL control channel module 508 may use one or more inputs or states to determine when and how to activate multi-CORESET monitoring. For example, the DL control channel module 508 may consider CORESET size, frequency range, subcarrier spacing, and type of search space (e.g. UE-specific vs common search space). The DL control channel module 508 may configure the UE 115 to monitor CORESETs with different frequencies, different CCE-to-REG mappings, different REG bundlings, and/or different TCI states or any other characteristic of the CORESETs through which diversity can be achieved. The DL control channel module 508 may also perform one or more techniques associated with techniques for hashing function perturbation for PDCCH monitoring aggregation. The DL control channel module 508 may determine that multi-CORESET monitoring should be configured based on some channel quality measurement, either direct or indirect. The DL control channel module 508 may pre-configure the UE 115 to do the monitoring subject to one or more of the above-noted conditions, for example.

As shown, the transceiver 510 may include the modem subsystem 512 and the RF unit 514. The transceiver 510 can be configured to communicate bi-directionally with other devices, such as the UEs 115 and/or another core network element. The transceiver 510 may transmit a DCI over a plurality of PDCCH monitoring occasions based at least in part on a frequency diversity and/or monitoring configuration. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to embodiments of the present disclosure. The antennas 516 may further receive data messages transmitted from other devices and provide the received data messages for processing and/or demodulation at the transceiver 510.

The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement RATs.

Figure 6:
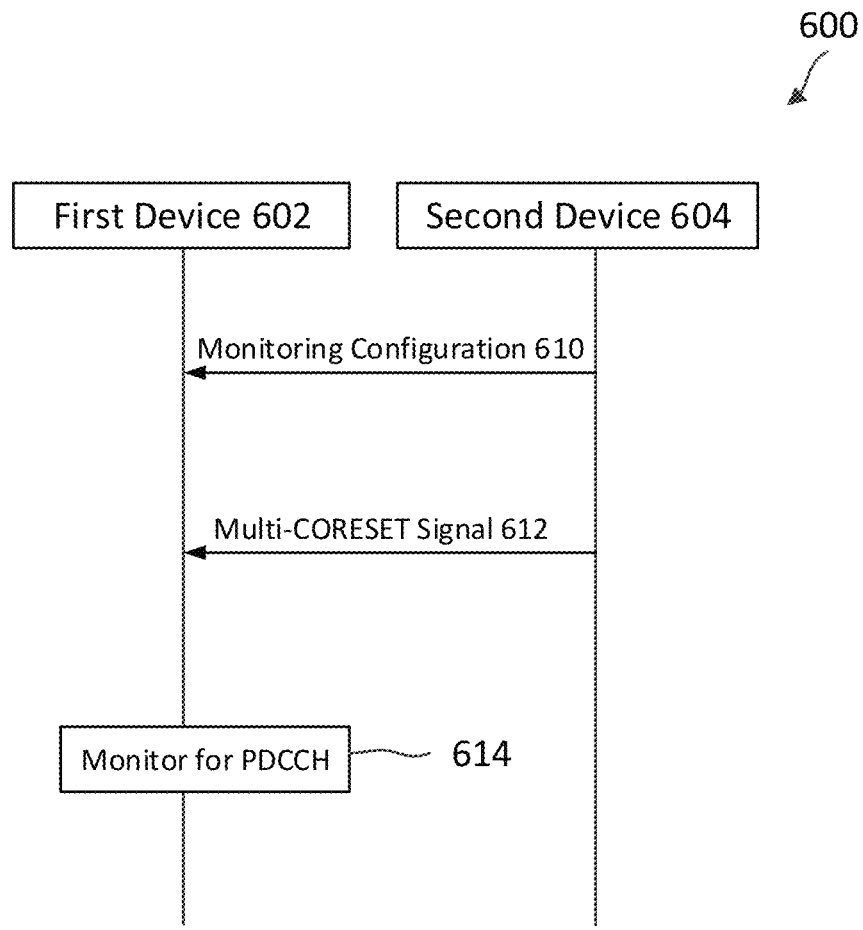
FIG. 6 illustrates a signaling diagram of a scheme for multi-CORESET monitoring according to some embodiments of the present disclosure.

FIG. 6 is a signaling diagram illustrating a communication method 600 with multiple different CORESETs according to some embodiments of the present disclosure. The method 600 may be implemented between a BS (e.g., BS 105 or BS 500) and a UE (e.g., the UE 115 or UE 400). In the illustration of FIG. 6, the first device 602 may be an example of the UE 400 and the second device 604 may be an example of the BS 500.

Figure 9:
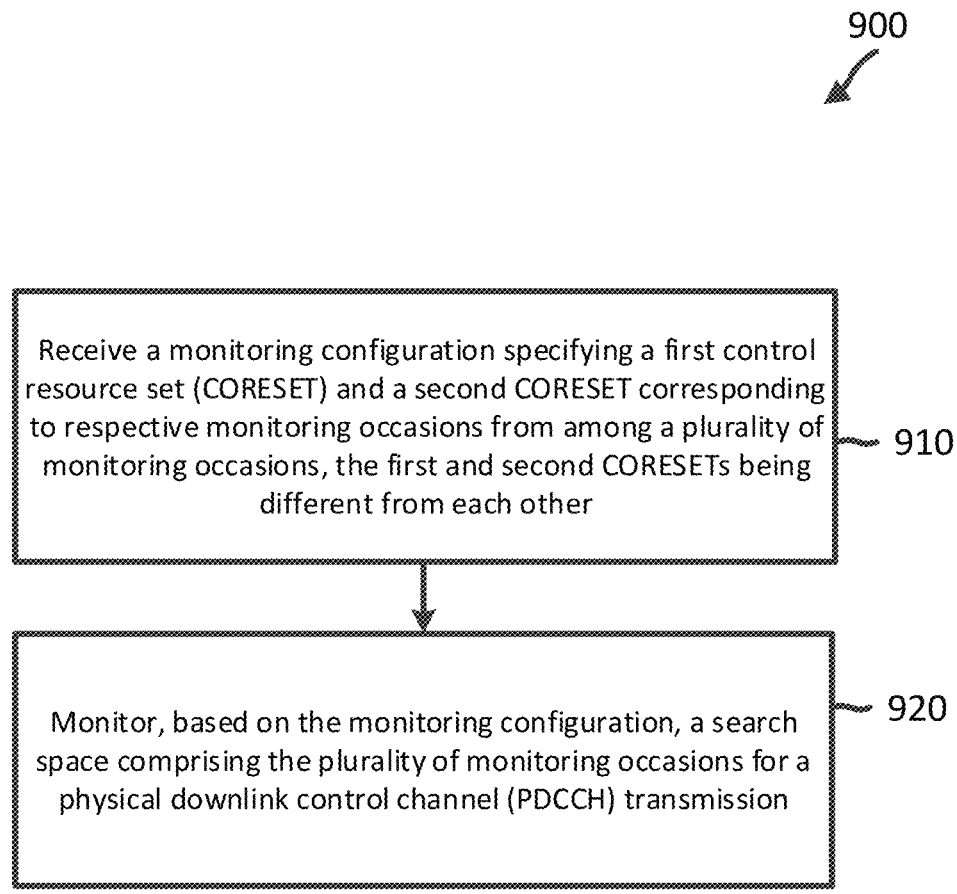
FIG. 9 illustrates a flow diagram of a wireless communication method according to some embodiments of the present disclosure
Figure 10:
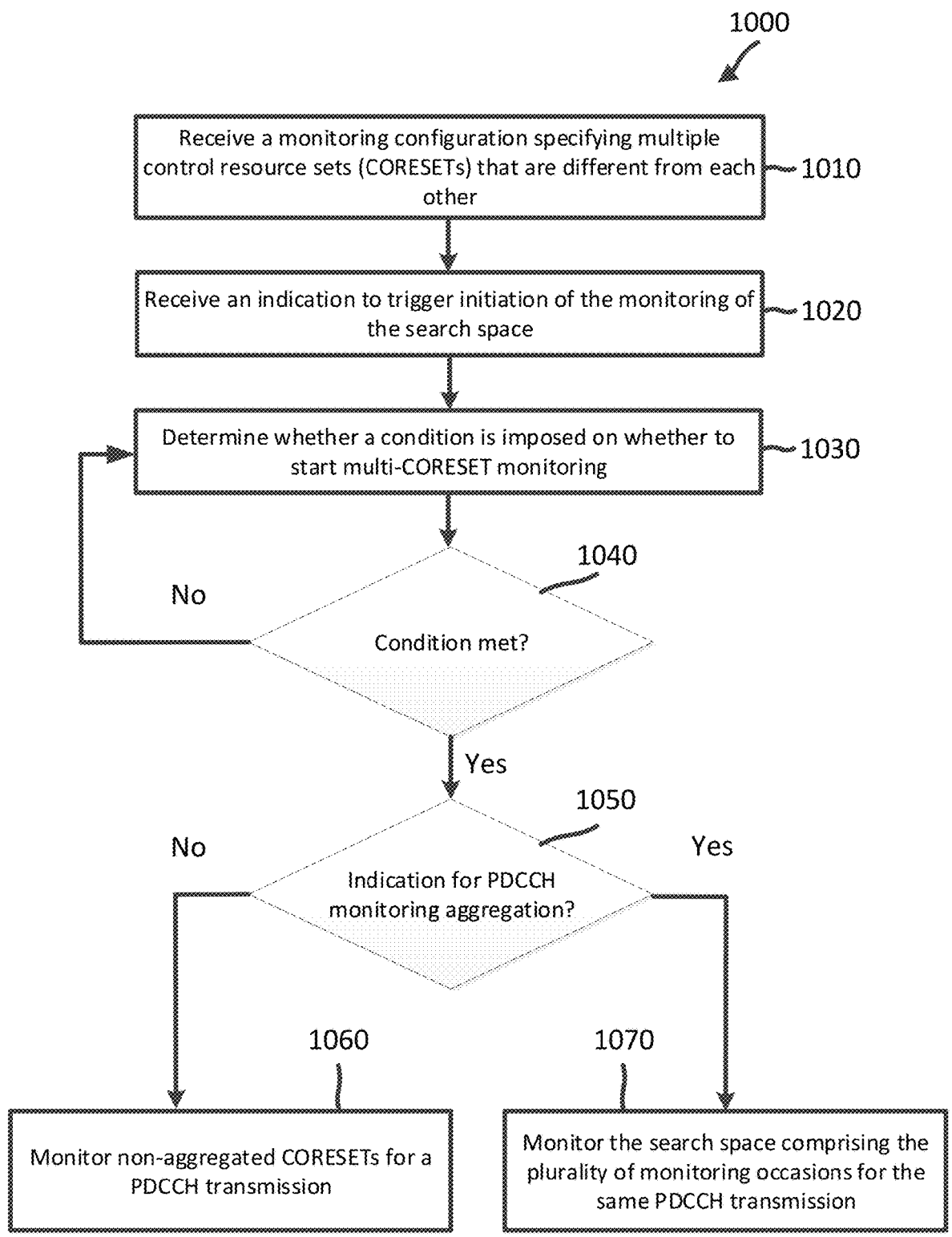
FIG. 10 illustrates a flow diagram of a wireless communication method according to some embodiments of the present disclosure.

The method 600 may employ similar mechanisms as in the structures 200 and/or 300 described above with respect to FIGS. 2 and 3 respectively, and/or methods 900 and 1000 described herein with respect to FIGS. 9 and 10, respectively. Steps of the method 600 can be executed by computing devices (e.g., a processor, processing circuit, and/or other suitable component) of the BS 500 and the UE. In an example, the BS 500 may utilize one or more components, such as the processor 502, the memory 504, the DL control channel module 508, the transceiver 510, the modem 512, and the one or more antennas 516, to execute the steps of method 600. The UE 400 may utilize one or more components, such as the processor 402, the memory 404, the PDCCH monitor module 408, the transceiver 410, the modem 412, and the one or more antennas 416, to execute the steps of method 600. As illustrated, the method 600 includes a number of enumerated steps, but embodiments of the method 600 may include additional steps before, after, and in between the enumerated steps. In some embodiments, one or more of the enumerated steps may be omitted or performed in a different order.

At action 610, the second device 604 transmits a monitoring configuration to the first device 602. The monitoring configuration may include configuration information for defining multiple CORESETs, and thereby for defining search spaces as described herein.

The first device 602 (e.g., UE 400), after receiving the monitoring configuration, may not begin to monitor multiple different CORESETs (such as different in frequency, CCE mapping, REG bundling, and/or different TCI states etc.) until it receives a multi-CORESET activation signal at action 612. The multi-CORESET signal may be an explicit signal indicating to the first device 602 that multiple different CORESETs should be monitored. The multi-CORESET signal may be semi-static via RRC configuration, and/or dynamic via MAC CE or UE-specific DCI or group-common DCI.

At action 614, the UE monitors its configured search space, including multiple different CORESETs (i.e., CORESETs with one or more different characteristics from each other) for PDCCH in accordance with the configuration and activation. Means for performing the functionality of action 614 can, but not necessarily, include, for example, PDCCH monitor module 408, transceiver 410, antennas 416, processor 402, and/or memory 404 of UE 400 with reference to FIG. 4.

Figure 7:
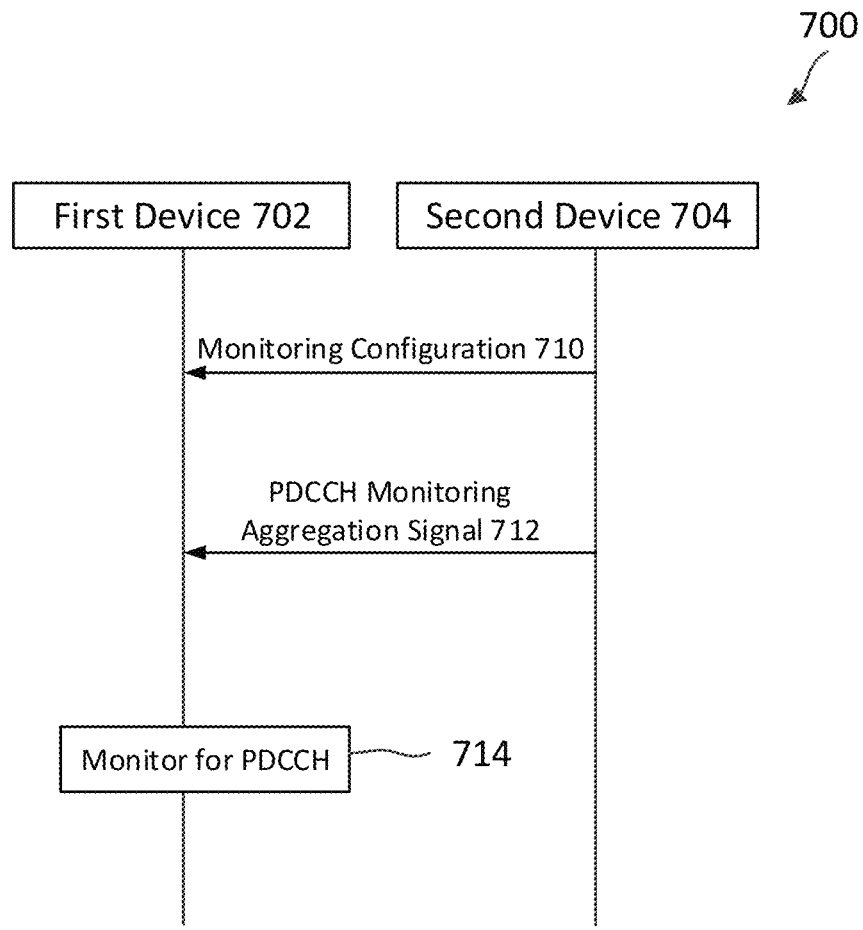
FIG. 7 illustrates a signaling diagram of a scheme for multi-CORESET monitoring according to some embodiments of the present disclosure.

FIG. 7 is a signaling diagram illustrating a communication method 700 with multiple different CORESETs according to some embodiments of the present disclosure. In contrast to the method 600, where multi-CORESET monitoring was activated explicitly, in FIG. 7 the multi-CORESET monitoring is activated implicitly. For example, in an embodiment the implicit activation is accomplished via a PDCCH monitoring aggregation signal. In the illustration of FIG. 7, the first device 702 may be an example of the UE 400 and the second device 704 may be an example of the BS 500.

The method 700 may be implemented between a BS (e.g., BS 105 or BS 500) and a UE (e.g., the UE 115 or UE 400). The method 700 may employ similar mechanisms as in the structure 300 described above with respect to FIG. 3, and/or methods 900, 1000, and 1100 described herein with respect to FIGS. 9, 10, and 11 respectively. Steps of the method 700 can be executed by computing devices (e.g., a processor, processing circuit, and/or other suitable component) of the BS 500 and the UE 400. In an example, the BS 500 may utilize one or more components, such as the processor 502, the memory 504, the DL control channel module 508, the transceiver 510, the modem 512, and the one or more antennas 516, to execute the steps of method 600. The UE 400 may utilize one or more components, such as the processor 402, the memory 404, the PDCCH monitor module 408, the transceiver 410, the modem 412, and the one or more antennas 416, to execute the steps of method 700. As illustrated, the method 700 includes a number of enumerated steps, but embodiments of the method 700 may include additional steps before, after, and in between the enumerated steps. In some embodiments, one or more of the enumerated steps may be omitted or performed in a different order.

At action 710, the second device 704 transmits a monitoring configuration to the first device 702. The monitoring configuration may include configuration information for defining multiple different CORESETs, and thereby for defining search spaces as described herein. This may be done semi-statically via RRC configuration messaging, for example.

The first device 702 (e.g., UE 400) after receiving the monitoring configuration, may not begin to monitor multiple different CORESETs (such as different in frequency, CCE mapping, REG bundling, and/or different TCI states etc.) until it receives a PDCCH monitoring aggregation signal at action 712. In this embodiment, when PDCCH monitoring aggregation is enabled, multi-CORESET monitoring is also enabled implicitly in accordance with the monitoring configuration. In this way, the aggregated monitoring occasions are associated with the same PDCCH transmission on different CORESETs that have some diversity in one or more characteristics (such as different in frequency, CCE mapping, REG bundling, and/or different TCI states etc.). The activation signal (PDCCH monitoring aggregation signal) may be semi-static via RRC configuration, and/or dynamic via MAC CE or UE-specific DCI or group-common DCI.

At action 714, the first device 702 monitors its configured search space, including multiple different CORESETs (i.e., CORESETs with one or more different characteristics from each other) for the same PDCCH in accordance with the configuration and activation (with aggregation, as discussed previously, to achieve greater power). Means for performing the functionality of step 714 can, but not necessarily, include, for example, PDCCH monitor module 408, transceiver 410, antennas 416, processor 402, and/or memory 404 of UE 400 with reference to FIG. 4.

Figure 8:
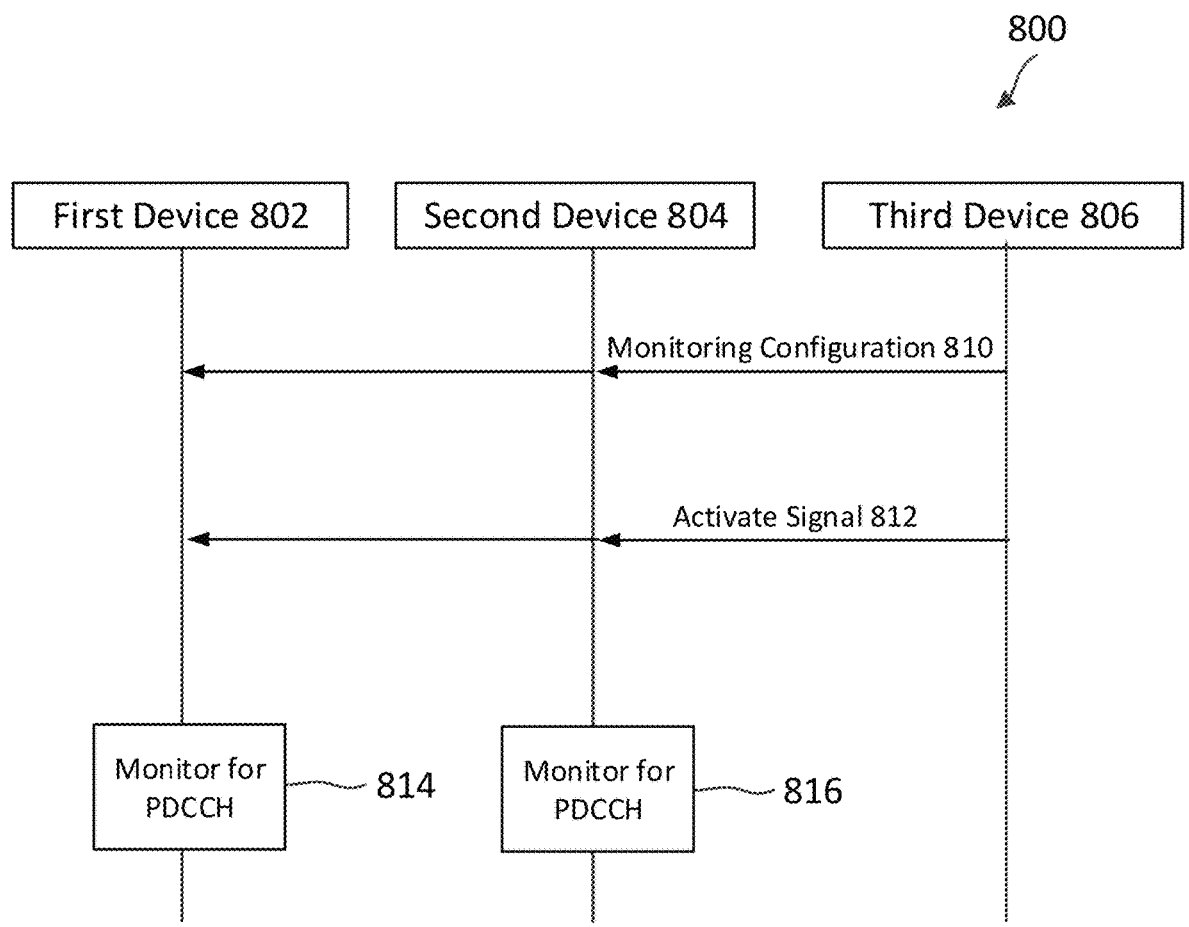
FIG. 8 illustrates a signaling diagram of a scheme for multi-CORESET monitoring with multiple devices according to some embodiments of the present disclosure.

FIG. 8 is a signaling diagram illustrating a communication method 800 with multiple different CORESETs according to some embodiments of the present disclosure. The method 800 may be implemented between a BS (e.g., BS 105 or BS 500) and multiple UEs (e.g., the UE 115 or UE 400). In the illustration of FIG. 8, the first and second devices 802, 804 may both be an example of the UE 400 and the third device 806 may be an example of the BS 500.

Figure 11:
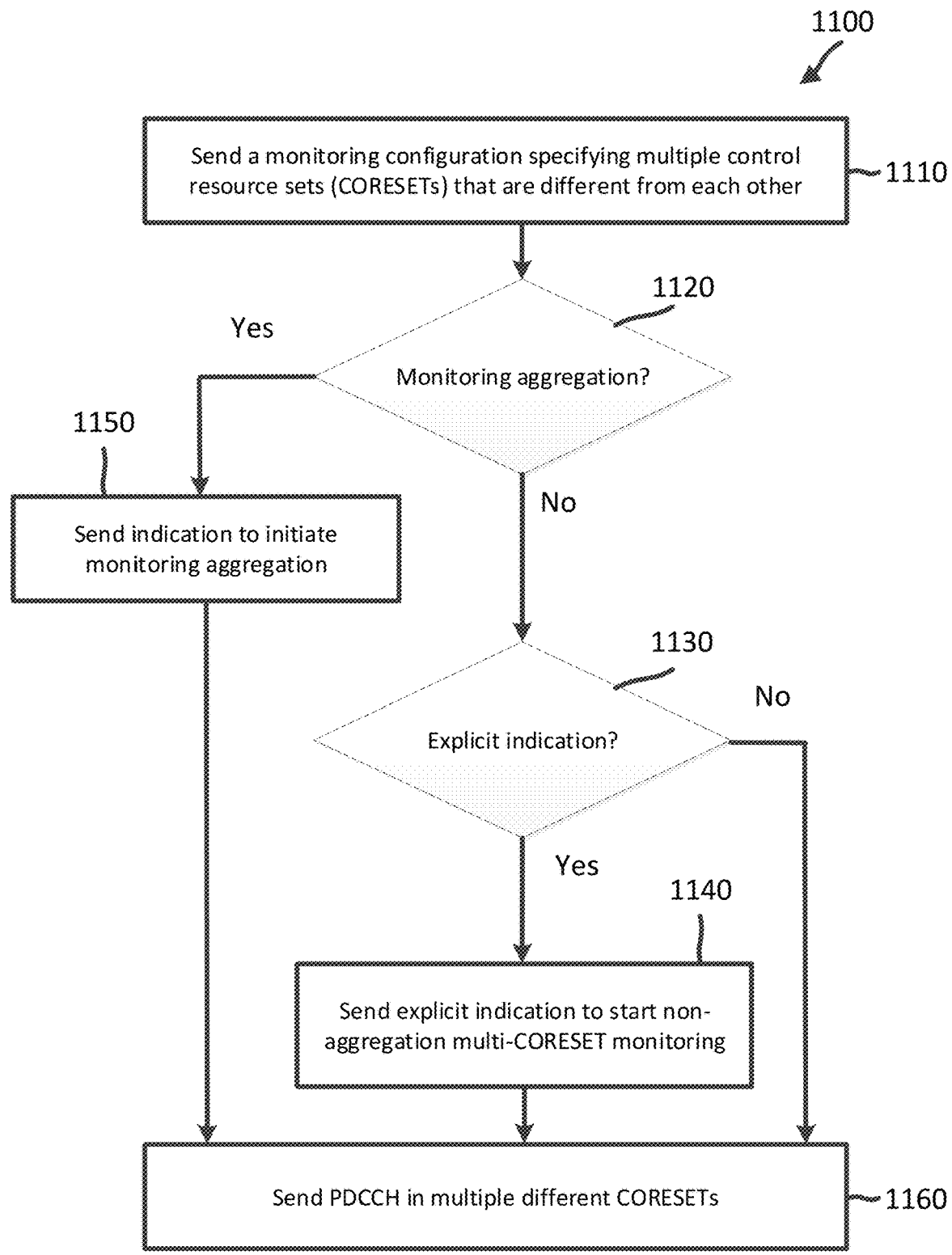
FIG. 11 illustrates a flow diagram of a wireless communication method according to some embodiments of the present disclosure.

The method 800 may employ similar mechanisms as in the structures 200 and/or 300 described above with respect to FIGS. 2 and 3 respectively, and/or methods 900, 1000, and 1100 described herein with respect to FIGS. 9, 10, and 11 respectively. Steps of the method 800 can be executed by computing devices (e.g., a processor, processing circuit, and/or other suitable component) of the BS 500 and the UE 400. In an example, the BS 500 may utilize one or more components, such as the processor 502, the memory 504, the DL control channel module 508, the transceiver 510, the modem 512, and the one or more antennas 516, to execute the steps of method 600. The UEs 400 may utilize one or more components, such as the processor 402, the memory 404, the PDCCH monitor module 408, the transceiver 410, the modem 412, and the one or more antennas 416, to execute the steps of method 800. As illustrated, the method 800 includes a number of enumerated steps, but embodiments of the method 800 may include additional steps before, after, and in between the enumerated steps. In some embodiments, one or more of the enumerated steps may be omitted or performed in a different order.

At action 810, the third device 806 (e.g., BS 500) transmits a monitoring configuration to the first device 802 and the second device 804. The monitoring configuration may be sent to each device individually through separate transmissions, or through a mechanism which communicates to both devices simultaneously. For example, the transmission may be an RRC configuration message, or a system information (SI) broadcast, etc. The monitoring configuration may include configuration information for defining multiple different CORESETs (such as different in frequency, CCE mapping, REG bundling, and/or different TCI states etc.), and for defining search spaces as described herein. one or both of the first and second devices 802, 804 may, after receiving the monitoring configuration, delay monitoring multiple different CORESETs until receiving an activate signal at action 812. Thus, the first device 802 may wait to monitor the multiple different CORESETs until it receives an activate signal, whether or not the second device 804 also receives an activate signal. Similar for the second device 804 with respect to the first device 802.

The activate signal may be, for example, an explicit signal indicating to the devices that multiple different CORESETs should be monitored (multi-CORESET monitoring). This is similar to the approach discussed above with respect to FIG. 6. The activate signal may be semi-static via RRC configuration, and/or dynamic via MAC CE or UE-specific DCI or group-common DCI. For example, each of the first device 802 and second device 804 may receive UE-specific DCIs separately targeted to each, while in other examples both devices may receive a group-common DCI (e.g., where both are in the same group).

At action 814, the first and second devices 802 and 804 monitor for PDCCH in accordance with the configuration and activation. Means for performing the functionality of step 814 when performed by a UE 400 can, but not necessarily, include, for example, PDCCH monitor module 408, transceiver 410, antennas 416, processor 402, and/or memory 404 with reference to FIG. 4.

FIG. 9 is a flow diagram of a communication method 900 according to some embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or UE 400, and may utilize one or more components, such as the processor 402, the memory 404, the PDCCH monitor module 408, the transceiver 410, the modem 412, and the one or more antennas 416, to execute the steps of method 900. The method 900 may employ similar mechanisms as in the structure described above with respect to FIGS. 2 and 3 and/or the schemes 600, 700, and 800, described with respect to FIGS. 6, 7, and 8 respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At block 910, a UE 400 receives a monitoring configuration specifying a first control resource set (CORESET) and a second CORESET. According to embodiments of the present disclosure, the first CORESET corresponds to a different monitoring occasion than the second CORESET, albeit within the same search space. Further, the first CORESET is different than the second CORESET either in frequency, CCE mapping, REG bundling, and/or TCI state. In some instances, means for performing the functionality of action 910 can, but not necessarily, include, for example, PDCCH monitor module 408, transceiver 410, antennas 416, processor 402, and/or memory 404 with reference to FIG. 4.

At action 920, the UE 400 monitors, based on the monitoring configuration, a search space comprising the plurality of monitoring occasions for a physical downlink control channel (PDCCH) transmission. This may include, in some examples, monitoring non-aggregated monitoring occasions for an instance of the PDCCH in one of the different CORESETs (e.g., different in frequency, CCE mapping, REG bundling, TCI state, etc.). In other examples, this may include monitoring the monitoring occasions as an aggregated set of occasions, i.e. each monitoring occasion includes the same PDCCH for increased coverage. With the addition of different CORESETs, additional reliability and robustness is introduced according to embodiments of the present disclosure. In some instances, means for performing the functionality of step 920 can, but not necessarily, include, for example, PDCCH monitor module 408, transceiver 410, antennas 416, processor 402, and/or memory 404 with reference to FIG. 4.

FIG. 10 is a flow diagram of a communication method 1000 according to some embodiments of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115 or UE 400, and may utilize one or more components, such as the processor 402, the memory 404, the PDCCH monitor module 408, the transceiver 410, the modem 412, and the one or more antennas 416, to execute the steps of method 1000. The method 1000 may employ similar mechanisms as in the structure described above with respect to FIGS. 2 and 3 and/or the schemes 600, 700, and 800, described with respect to FIGS. 6, 7, and 8 respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At block 1010, the UE 400 receives a monitoring configuration specifying multiple CORESETs that are different from each other (e.g., different frequencies, CCE mappings, REG bundlings, and/or TCI states to name some examples). In some instances, means for performing the functionality of step 1010 can, but not necessarily, include, for example, PDCCH monitor module 408, transceiver 410, antennas 416, processor 402, and/or memory 404 with reference to FIG. 4.

At block 1020, the method 1000 includes receiving an indication that triggers initiation of the multi-CORESET search space monitoring. The indication may assume a number of forms, for example an explicit activation of multi-coreset PDCCH monitoring through an RRC configuration message, a UE-specific DCI message, or group-common DCI message. As another example, the activation may be implicit through the activation of some other configuration which the device has been preconfigured to recognize as an indication to activate multi-CORESET monitoring.

At block 1030, the UE 400 determines whether a condition is imposed on when multi-CORESET monitoring according to embodiments of the present disclosure may begin. For example, multi-CORESET monitoring may be conditioned on the size of the CORESET, either in terms of number of RBs and/or OFDM symbols. As another example, it may be conditioned on the frequency range available. As a further example, the multi-CORESET monitoring may be conditioned on subcarrier spacing. As another example, it may be conditioned on the type of search space (e.g. UE-specific vs common search space). These are just a few examples. The multi-CORESET may be conditioned upon any one or more of such examples (e.g., a subset or all of them). Block 1030 may be optional—in some situations the BS 500 may not have configured the UE 400 to depend on any such condition for multi-CORESET monitoring according to embodiments of the present disclosure. In such situations, the UE 400 may proceed from block 1020 to decision block 1050 without having to test for a condition on operation.

At decision block 1040, the UE 400 determines whether the condition determined from block 1030 has been met. For example, where a condition is imposed that requires at least CORESET of a particular size (e.g., larger than a certain size or smaller than a certain size), the UE 400 may determine whether that size condition has been met. As another example, where the condition is on the frequency range, the UE 400 may determine whether the range has been met. Whatever the condition imposed, the UE 400 may return to block 1030 if the UE 400 determines that the condition has not yet been met. In that case, operation will continue to check whether the condition has been met unless the UE 400 is signaled to stop multi-CORESET monitoring by another monitoring configuration message and/or indication message.

If, instead, the UE 400 determines at decision block 1040 that the condition has been met, then the method 1000 proceeds to decision block 1050.

At decision block 1050, the UE 400 determines whether the indication received at block 100 was a signal to activate PDCCH monitoring aggregation (referred to elsewhere herein as implicit signaling for multi-CORESET monitoring using PDCCH monitoring aggregation) or, in contrast, some other configuration message for non-aggregation multi-CORESET monitoring (referred to elsewhere herein as a situation of explicit signaling).

If the indication was not to activate PDCCH monitoring aggregation, e.g. it was instead an explicit signal, then the method 1000 proceeds to block 1060. At block 1060, the UE 400 begins monitoring non-aggregated CORESETs for a PDCCH transmission. While the CORESET monitoring occasions are non-aggregated in this situation, diversity is provided between CORESETs according to embodiments of the present disclosure either in frequency, CCE mapping, REG bundling, TCI state, or some combination of these.

Returning to decision block 1040, if instead the UE 400 determines that the indication was to activate PDCCH monitoring aggregation, the method 1000 proceeds to block 1070. At block 1070, the UE 400 initiates monitoring of the search space comprising the plurality of monitoring occasions for a repeated PDCCH transmission (i.e., repeated in each monitoring occasion of the search space).

In some instances, means for performing the functionality of the blocks of method 1000 can, but not necessarily, include, for example, PDCCH monitor module 408, transceiver 410, antennas 416, processor 402, and/or memory 404 with reference to FIG. 4.

FIG. 11 is a flow diagram of a communication method 1100 according to some embodiments of the present disclosure. Steps of the method 1100 can be executed by a computing device (e.g., a processor, processing circuit, and/or other suitable component) of a wireless communication device or other suitable means for performing the steps. For example, a wireless communication device, such as the BS 105 or BS 500, may utilize one or more components, such as the processor 502, the memory 504, the DL control channel module 508, the transceiver 510, the modem 512, and the one or more antennas 516, to execute the steps of method 1100. The method 1100 may employ similar mechanisms as in the structure described above with respect to FIGS. 2 and 3 and/or the schemes 600, 700, and 800, described with respect to FIGS. 6, 7, and 8 respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At block 1110, the BS 500 sends a monitoring configuration message to one or more UEs, such as UEs 400, specifying multiple CORESETs that are different from each other (e.g., different frequencies, CCE mappings, REG bundlings, and/or TCI states to name some examples).

At decision block 1120, the BS 500 determines whether PDCCH monitoring aggregation will be used or not. If not, then the method 1100 proceeds to decision block 1130.

At decision block 1130, the BS 500 determines whether it is going to send an explicit indication of when to start multi-CORESET monitoring at the UE 400. If the BS 500 is going to send an explicit indication (e.g., such as via RRC configuration signaling, MAC CE, UE-specific DCI, or group-common DCI as some examples), then the method 1100 proceeds to block 1140.

At block 1140, the BS 500 sends the explicit indication (via one of the approaches noted above for example) to the UE 400 to trigger the UE 400 to start non-aggregation multi-CORESET PDCCH monitoring according to embodiments of the present disclosure. While the CORESET monitoring occasions are non-aggregated in this situation, diversity is provided between CORESETs according to embodiments of the present disclosure either in frequency, CCE mapping, REG bundling, TCI state, or some combination of these.

Returning to decision block 1130, if instead there is no explicit indication, the method 1100 may proceed to block 1160 without block 1140's action. This may correspond, for example, to situations where the UE 400 is pre-configured (e.g., via the monitoring configuration 1110) to begin multi-CORESET monitoring by default without requiring activation, thereby reducing at least one aspect of signaling overhead.

Returning now to decision block 1120, if the BS 500 determines that monitoring aggregation will be used, then the method 1100 proceeds instead to block 1150.

At block 1150, the BS 500 prepares and sends to the UE 400 an indication to initiate PDCCH monitoring aggregation. This, according to embodiments of the present disclosure, may be an implicit indication to the UE 400 to also begin multi-CORESET monitoring according to embodiments of the present disclosure. Alternatively, the indication to initiate PDCCH monitoring aggregation may also include an explicit bit or combination of bits signifying to the UE 400 to start multi-CORESET monitoring as part of the PDCCH monitoring aggregation as well. The indication may be transmitted as part of an RRC configuration message, a MAC CE, UE-specific DCI, or group common DCI. From block 1150, the method 1100 proceeds to block 1160.

At block 1160, whether from block 1140 or block 1150, the BS 500 proceeds with sending one or more PDCCHs to the UE 400 in different CORESETs (e.g., either different in frequency, CCE mapping, REG bundling, TCI states, some combination of these, etc.).

Figure 12:
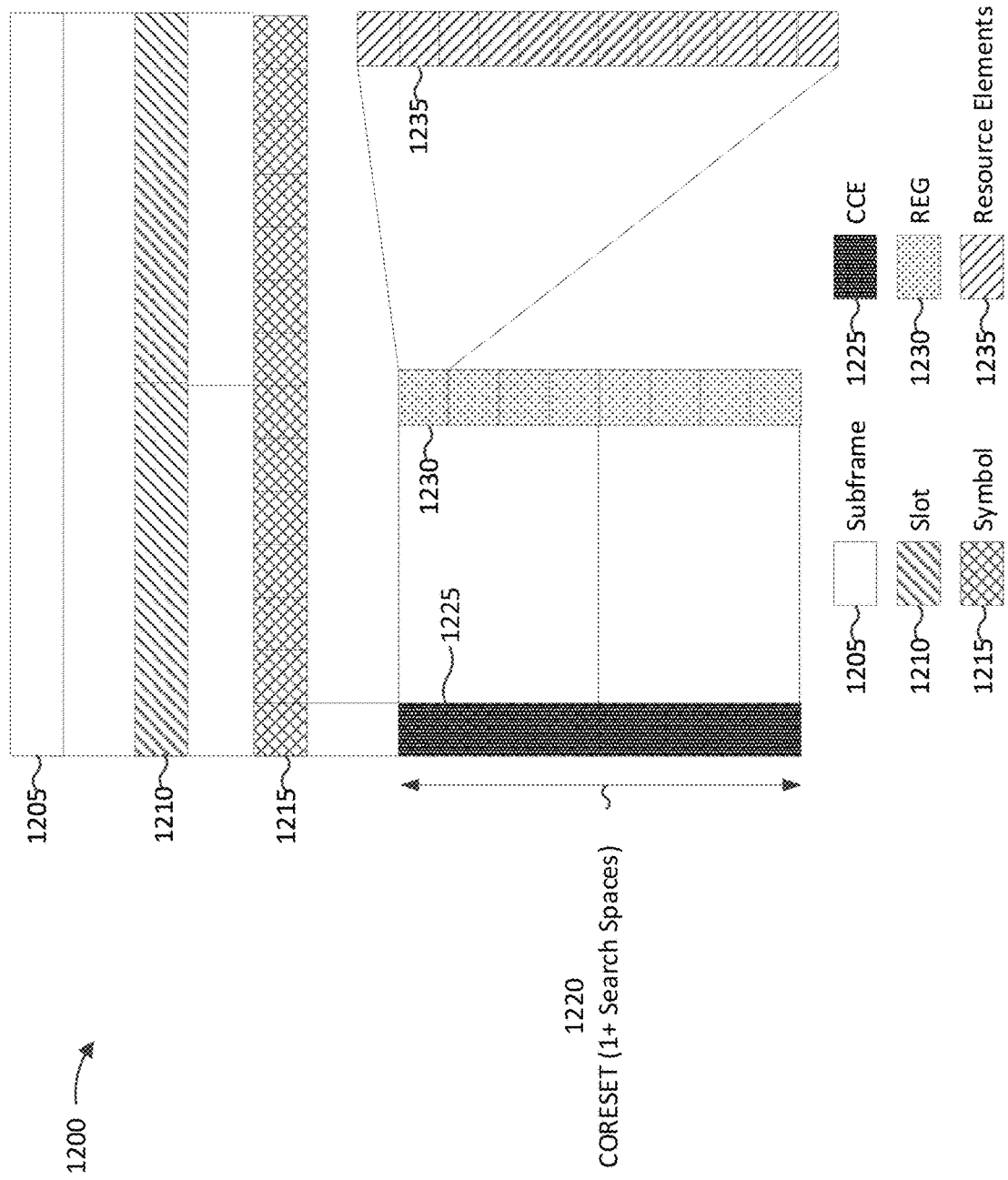
FIG. 12 illustrates a diagram of an example resource structure for wireless communication according to some embodiments of the present disclosure.

FIG. 12 is a diagram illustrating an example resource structure 1200 for wireless communication, in accordance with various aspects of the present disclosure. Resource structure 1200 shows an example of various groups of resources described herein. As shown, resource structure 1200 may include a subframe 1205. Subframe 1205 may include multiple slots 1210. While resource structure 1200 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 1210 may include multiple symbols 1215, such as 7 symbols or 14 symbols per slot.

The potential control region of a slot 1210 may be referred to as a control resource set (CORESET) 1220 and may be structured to support an efficient use of resources, such as by flexible configuration or reconfiguration of resources of the CORESET 1220 for one or more PDCCHs, one or more physical downlink shared channels (PDSCHs), and/or the like. In some aspects, the CORESET 1220 may occupy the first symbol 1215 of a slot 1210, the first two symbols 1215 of a slot 1210, or the first three symbols 1215 of a slot 1210. Thus, a CORESET 1220 may include multiple resource blocks (RBs) in the frequency domain, and either one, two, or three symbols 1215 in the time domain. In 5G, a quantity of resources included in the CORESET 1220 may be flexibly configured, such as by using radio resource control (RRC) signaling to indicate a frequency domain region (e.g., a quantity of resource blocks) and/or a time domain region (e.g., a quantity of symbols) for the CORESET 1220.

As illustrated, a symbol 1215 that includes CORESET 1220 may include one or more control channel elements (CCEs) 1225, shown as two CCEs 1225 as an example, that span a portion of the system bandwidth. A CCE 1225 may include DCI that is used to provide control information for wireless communication. A base station may transmit DCI during multiple CCEs 1225 (as shown), where the quantity of CCEs 1225 used for transmission of DCI represents the aggregation level (AL) used by the BS for the transmission of DCI. In FIG. 12, an aggregation level of two is shown as an example, corresponding to two CCEs 1225 in a slot 1210. In some aspects, different aggregation levels may be used, such as 1, 4, 8, 16, and/or the like.

Each CCE 1225 may include a fixed quantity of resource element groups (REGs) 1230, shown as 4 REGs 1230, or may include a variable quantity of REGs 1230. In some aspects, the quantity of REGs 1230 included in a CCE 1225 may be specified by a REG bundle size. A REG 1230 may include one resource block, which may include 12 resource elements (REs) 1235 within a symbol 1215. A resource element 1235 may occupy one subcarrier in the frequency domain and one OFDM symbol in the time domain.

A search space may include all possible locations (e.g., in time and/or frequency) where a PDCCH may be located. A CORESET 1220 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 1220 may be interleaved or non-interleaved. An interleaved CORESET 1220 may have CCE-to-REG mapping such that adjacent CCEs are mapped to scattered REG bundles in the frequency domain (e.g., adjacent CCEs are not mapped to consecutive REG bundles of the CORESET 1220). A non-interleaved CORESET 1220 may have a CCE-to-REG mapping such that all CCEs are mapped to consecutive REG bundles (e.g., in the frequency domain) of the CORESET 1220.

A base station may transmit repetitions of DCI over a plurality of PDCCH monitoring occasions to facilitate connection reliability and successful reception of the DCI by the UE. In some cases, the monitoring occasions may be aggregated. Each aggregated set of monitoring occasions may be allocated with one or more CCEs and an aggregation level may indicate the number of CCEs allocated. The transmission of repetitions of DCI over the PDCCH monitoring occasions may be referred to as an "enhanced-coverage PDCCH" procedure.

In a typical implementation, a search space is associated with a single CORESET (which is configured with a frequency allocation and type of REG bundling and CCE mapping). Without the addition of some form of diversity, repetitions of DCI transmitted over a plurality of PDCCH monitoring occasions of a search space will use the same frequency resources and/or beam for each of the PDCCH monitoring occasions. This may lead to increased blocking probability, interference, and reduced connection reliability. The indexes of CCEs within a search space (e.g., the location of the CCEs) are determined using a hashing function that is a function of a carrier indicator field, a slot number, an aggregation level, a radio network temporary identifier (RNTI), a PDCCH candidate index, and an aggregation level.

In some aspects, a base station 105 may configure a UE 115 with a frequency diversity configuration (or monitoring configuration) that includes repetition of DCI over a plurality of PDCCH monitoring occasions of a search space. In some aspects, at least two of the PDCCH monitoring occasions may be associated with different frequency resource allocations. In some aspects, a frequency offset may be added to a frequency allocation of the CORESET associated with the search space. In this way, aspects may facilitate providing diversity of frequency.

In some aspects, the frequency diversity configuration (or monitoring configuration) may be activated based at least in part on activation of PDCCH monitoring aggregation or based at least in part on a dedicated activation indication. In this way, the configuration may be deactivated during situations in which frequency diversity may be less beneficial (e.g., when there is less competing traffic, when there are fewer potential sources of interference, and/or the like) and activated during situations in which frequency diversity may be more beneficial. As a result, aspects may lead to more efficient implementation of enhanced coverage that may facilitate decreased blocking probability, decreased interference, and enhanced connection reliability.

As indicated in 3GPP 38.213, the set of CCE indexes corresponding to the PDCCH candidates of a search space is given by a hashing function. For a search space set, s, associated with CORESET, p, the CCE indexes for aggregation level, L, corresponding to PDCCH candidate $m_{s,n_{Cl}}$, of the search space set in slot, $n_{s,f}^{\mu}$, for an active downlink (DL) bandwidth part (BWP) of a serving cell corresponding to carrier indicator field value, $n_{Cl}$, are given by:

$$L \cdot \left\{ \left( Y_{p,n_{s,f}^{\mu}} + \left\lfloor \frac{m_{s,n_{Cl}} \cdot N_{CCE,p}}{L \cdot M_{s,max}^{(L)}} \right\rfloor + n_{Cl} \right) \bmod \left\lfloor \frac{N_{CCE,p}}{L} \right\rfloor \right\} + i$$

where for any common search space (CSS), $Y_{p,n_{s,f}^{\mu}}=0$;
for a UE-specific search space (USS), $Y_{p,n_{s,f}^{\mu}}=(A_p \cdot Y_{p,n_{s,f}-1^{\mu}}) \bmod D$, $Y_{p,-1}=n_{RNTI} \neq 0$,
$A_p=39827$ for p mod 3=0, $A_p=39829$ for p mod 3=1, $A_p=39839$ for p mod 3=2, and D=65537;
i=0, . . . , L−1;
$N_{CCE,p}$ is the number of CCEs, numbered from 0 to $N_{CCE,p}-1$, in CORESET, p;
$n_{Cl}$ is the carrier indicator field value if the UE is configured with a carrier indicator field by CrossCarrier-SchedulingConfig for the serving cell on which PDCCH is monitored; otherwise, including for any CSS, $n_{Cl}=0$;
$m_{s,n_{Cl}}=0, \ldots, M_{s,n_{Cl}}^{(L)}-1$, where $M_{s,n_{Cl}}^{(L)}$ is the number of PDCCH candidates the UE is configured to monitor for aggregation level, L, of a search space set, s, for a serving cell corresponding to $n_{Cl}$;
for any CSS, $M_{s,max}^{(L)}=M_{s,0}^{(L)}$;
for a USS, $M_{s,max}^{(L)}$ is the maximum of $M_{s,n_{Cl}}^{(L)}$ over all configured $n_{Cl}$ values for a CCE aggregation level, L, of search space set, s; and
the RNTI value used for $n_{RNTI}$ is the cell-RNTI (C-RNTI).

As a result, if two or more PDCCH monitoring occasions are implemented within a particular slot (e.g., for monitoring by two or more different UEs), the locations of the corresponding CCEs will be the same. This may lead to increased PDCCH blocking, increased interference, and reduced connection reliability.

Various aspects of the techniques and apparatuses described herein may facilitate randomizing frequency resources used for CCEs. Aspects may facilitate perturbation of the hashing function to create a plurality of new hashing functions in which a CCE index is a function of a location, within a slot, of a corresponding PDCCH monitoring occasion, a function of an index of the corresponding PDCCH monitoring occasion, and/or the like. In some aspects, a base station may configure a monitoring configuration that indicates a plurality of hashing functions for identifying one or more CCE indexes of a set of PDCCH candidates of a search space. In some aspects, the hashing function may be modified by an additive factor, a multiplicative factor, and/or the like. In this way, aspects may facilitate providing hashing functions for determining CCE indexes as a function of monitoring occasion location, monitoring occasion index, and/or the like. As a result, aspects may facilitate reducing PDCCH blocking, reducing interference, and increasing connection reliability.

In some aspects, the monitoring configuration may be activated based at least in part on activation of PDCCH monitoring aggregation or based at least in part on a dedicated activation indication. In this way, the monitoring configuration may be deactivated during situations in which CCE indexes diversity may be less beneficial (e.g., when there is less competing traffic, when there are fewer potential sources of interference, and/or the like) and activated during situations in which CCE indexes diversity may be more beneficial. As a result, aspects may lead to more efficient implementation of enhanced coverage that may facilitate decreased blocking probability, decreased interference, and enhanced connection reliability.

As indicated above, FIG. 12 is provided as an example. Other examples may differ from what is described with respect to FIG. 12.

Figure 13:
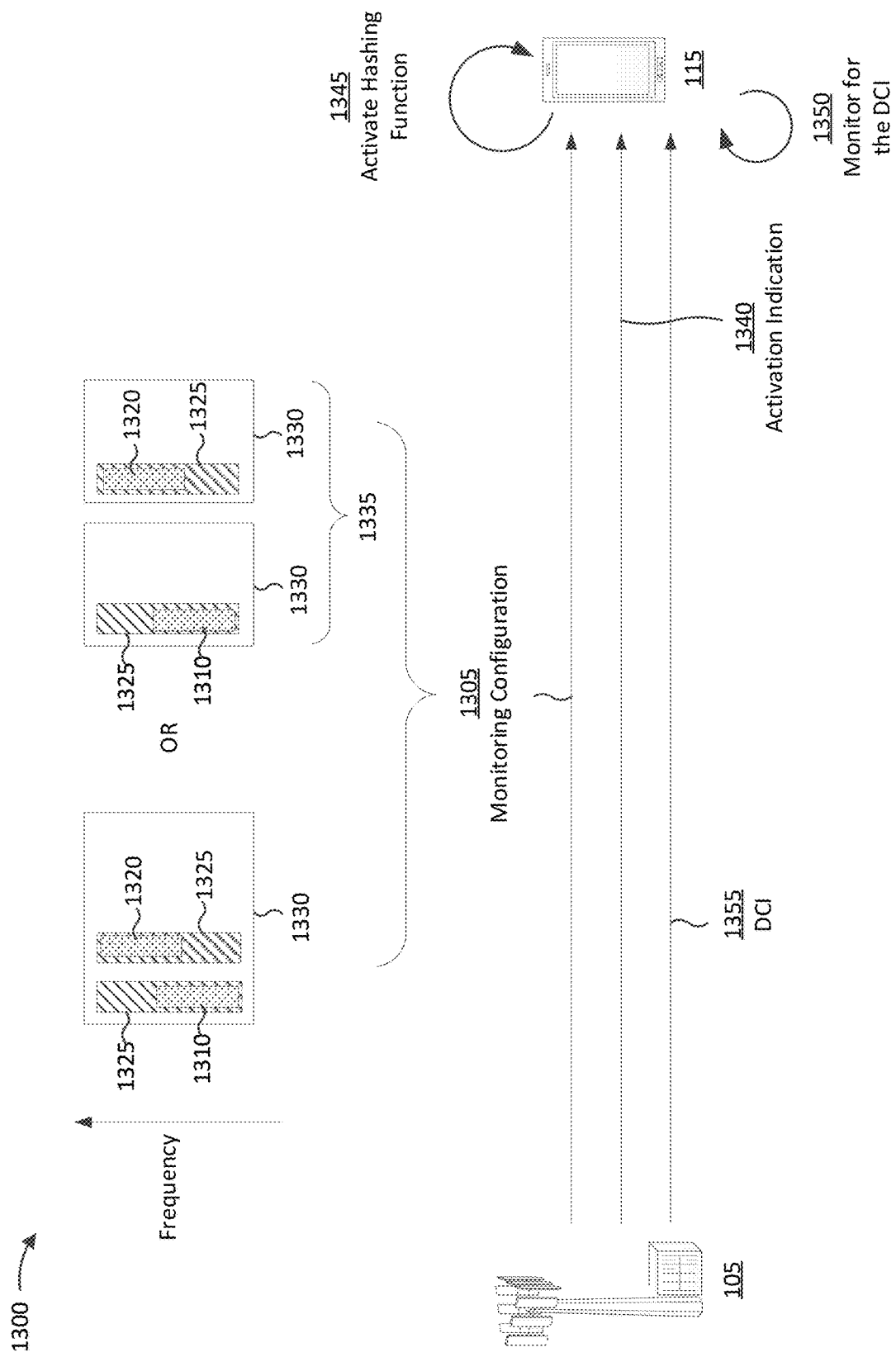
FIG. 13 illustrates a diagram of an example associated with techniques for DL monitoring with diversity according to some embodiments of the present disclosure.

FIG. 13 is a diagram illustrating an example 1300 of techniques for hashing function perturbation for PDCCH monitoring aggregation, in accordance with various aspects of the present disclosure. As shown in FIG. 13, a base station 105 and a UE 115 may communicate with one another.

As shown by reference number 1305, the base station 105 may transmit, and the UE 115 may receive, a monitoring configuration. In some aspects, the monitoring configuration may include repetition of DCI over a plurality of PDCCH monitoring occasions of a search space. In some aspects, the monitoring configuration may indicate a plurality of hashing functions for identifying one or more CCE indexes corresponding to one or more CCEs 1310 and 1320 of a set of PDCCH candidates of the search space.

In some aspects, a hashing function of the plurality of hashing functions may be dependent on a position of a corresponding PDCCH monitoring occasion 1325 of the plurality of PDCCH monitoring occasions, an index associated with the corresponding PDCCH monitoring occasion 1325, and/or a combination thereof. For example, as shown, in some aspects, the hashing function (and, thus, the location of a CCE 1310 or 1320) may be dependent on the position of the corresponding PDCCH monitoring occasion 1325 within a slot 1330. As is further shown, the hashing function (and, thus, the location of a CCE 1310 or 1320) may be dependent on the position or index of the corresponding PDCCH monitoring occasion 1325 within an aggregation 1335 of slots 1330.

In some aspects, as discussed above in connection with FIG. 12, the hashing function may include a main term multiplied by a modulo function. The main term may include the index associated with the corresponding PDCCH monitoring occasion. In some aspects, the index associated with the corresponding PDCCH monitoring occasion may include an index of an initial symbol of the corresponding PDCCH monitoring occasion, an index of the corresponding PDCCH monitoring occasion, and/or the like.

According to various aspects, the main term may include a first term that includes a multiplicative factor multiplied by a first variable that is based at least in part on an RNTI associated with the UE and a second term that is based at least in part on a number of PDCCH candidates in the set of PDCCH candidates.

In some aspects, the index associated with the corresponding PDCCH monitoring occasion may be added to the first term and the second term. For example, in some aspects, the hashing function described above in connection with FIG. 12 may be modified by adding the index, K, to the first and second terms, to give:

$$L \cdot \left\{ \left( Y_{p, n_{s,f}^\mu} + \left\lfloor \frac{m_{s,n_{CI}} \cdot N_{CCE,p}}{L \cdot M_{s,max}^{(L)}} \right\rfloor + K + n_{CI} \right) \bmod \left\lfloor \frac{N_{CCE,p}}{L} \right\rfloor \right\} + i$$

In some aspects, the index associated with the corresponding PDCCH monitoring occasion may be multiplied by the multiplicative factor. That is, for example, $A_p$ may be multiplied by the index, K. Any number of other mathematical operations may be performed to modify the existing hashing function to generate the new hashing function, in accordance with aspects described herein.

As shown by reference number 1340, the base station 105 may transmit, and the UE 115 may receive, an activation indication. According to various aspects, the activation indication may be carried in a radio resource control (RRC) message configuration, a medium access control (MAC) control element (MAC-CE), UE-specific DCI, group-common DCI, and/or the like. As shown by reference number 1345, the activation indication may cause the UE 115 to activate a hashing function of the plurality of configured hashing functions. In some aspects, the activation indication may cause the UE 115 to activate the hashing function directly or indirectly.

In some aspects, for example, the activation indication may include a PDCCH monitoring aggregation procedure activation indication. The UE 115 may activate a PDCCH monitoring aggregation procedure based at least in part on the PDCCH monitoring aggregation procedure activation indication. In some aspects, the UE 115 may activate the hashing function of the plurality of configured hashing functions based at least in part on activation of the PDCCH monitoring aggregation procedure. In some aspects, the activation indication may include a hashing function perturbation activation indication. The UE 115 may activate the hashing function based at least in part on the hashing function perturbation activation indication.

As shown by reference number 450, the UE 115 may monitor for the DCI in the search space associated with the plurality of PDCCH monitoring occasions based at least in part on the monitoring configuration. As shown by reference number 1355, the base station 105 may transmit, and the UE 115 may receive, the DCI. In some aspects, the base station 105 may transmit the DCI over the plurality of PDCCH monitoring occasions based at least in part on the monitoring configuration.

In some aspects, the UE 115 and/or the base station 105 may determine that a parameter satisfies a condition, and the UE 115 may perform the PDCCH monitoring based at least in part on the determination that the parameter satisfies the condition. In some aspects, the parameter may indicate a size of a CORESET (e.g., in a number of RBs, a number of orthogonal frequency division multiplexing (OFDM) symbols, and/or the like) associated with the search space, a size of a bandwidth (e.g., in number of RBs) associated with the search space, a frequency range associated with the search space, a subcarrier spacing associated with the search space, a search space type (e.g., a UE-specific search space, a common search space, and/or the like) associated with the search space, and/or the like.

Various aspects of the techniques and apparatuses described herein may facilitate randomizing frequency resources used for CCEs, thereby providing diversity of CCE locations. Aspects may facilitate perturbation of the hashing function to create a plurality of new hashing functions in which a CCE index is a function of a location, within a slot, of a corresponding PDCCH monitoring occasion, a function of an index of the corresponding PDCCH monitoring occasion, and/or the like. As a result, aspects may lead to more efficient implementation of enhanced coverage that may facilitate decreased blocking probability, decreased interference, and enhanced connection reliability.

As indicated above, FIG. 13 is provided as an example. Other examples may differ from what is described with respect to FIG. 13.

Figure 14:
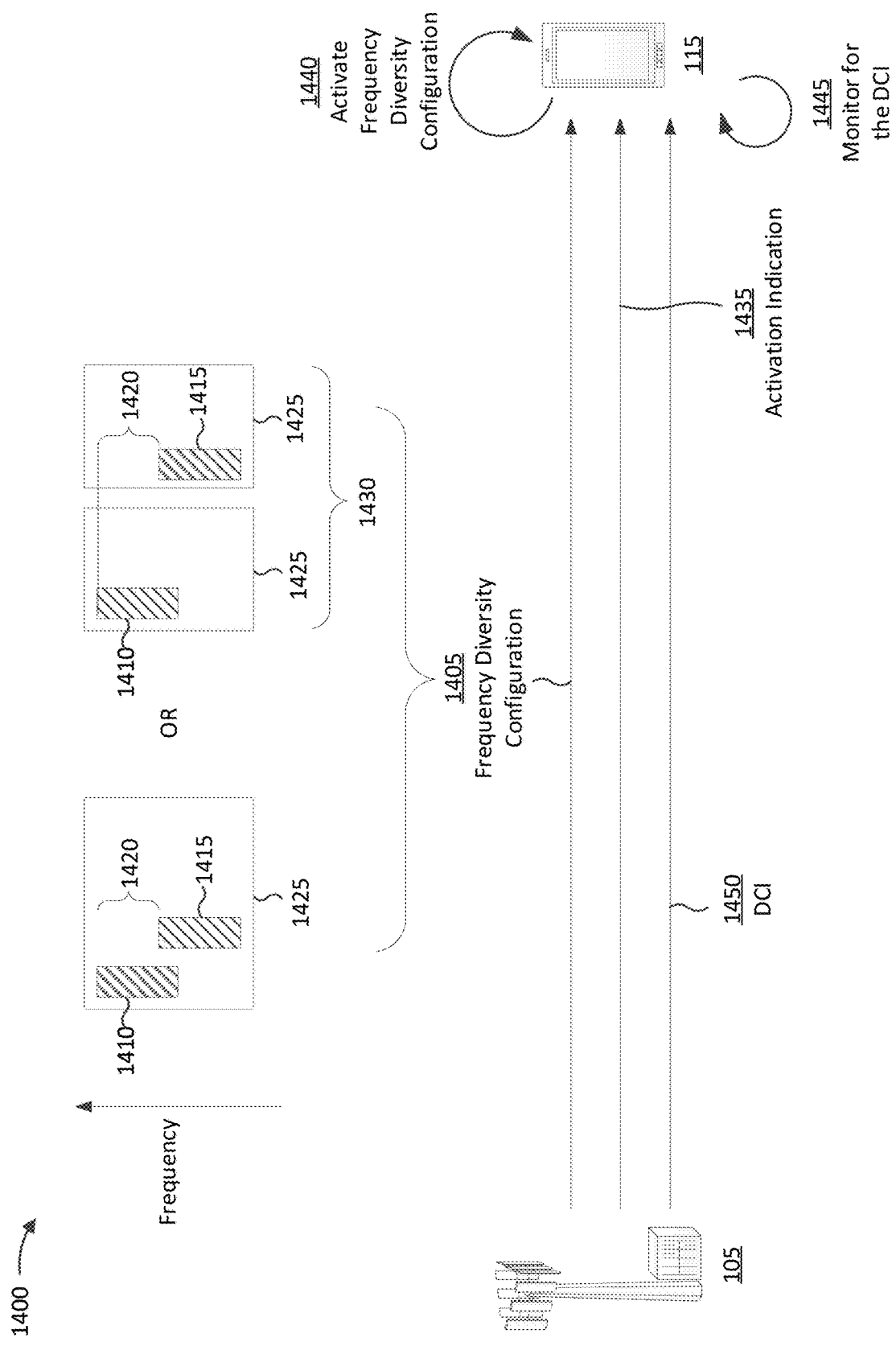
FIG. 14 illustrates a diagram of an example associated with techniques for DL monitoring with diversity according to some embodiments of the present disclosure.

FIG. 14 is a diagram illustrating an example 1400 of PDCCH monitoring with frequency diversity, in accordance with various aspects of the present disclosure. As shown in FIG. 14, a base station 105 and a UE 115 may communicate with one another.

As shown by reference number 1405, the base station 105 may transmit, and the UE 115 may receive, a frequency diversity configuration (which may be a monitoring configuration, or be included in a monitoring configuration). In some aspects, the frequency diversity configuration may include repetition of DCI over a plurality of PDCCH monitoring occasions of a search space. In some aspects, as shown, at least two PDCCH monitoring occasions 1410 and 1415 of the plurality of PDCCH monitoring occasions may be associated with different frequency resource allocations.

In some aspects, the base station 105 may transmit, and the UE 115 may receive, an indication of a frequency offset 1420 associated with at least one PDCCH monitoring occasion 1415 of the at least two PDCCH monitoring occasions 1410 and 1415. In some aspects, receiving an indication of the frequency offset may include receiving an indication of a frequency allocation of a CORESET associated with the search space. The frequency allocation of the CORESET may indicate the frequency offset. In some aspects, the frequency offset may include a multiple of six resource blocks (RBs).

In some aspects, as shown, the first PDCCH monitoring occasion 1410 may be associated with a first frequency resource allocation and the second PDCCH monitoring occasion 1415 may be associated with a second frequency resource allocation. The second frequency resource allocation may indicate the frequency offset 1420. In some aspects, the indication of the frequency offset 1420 may indicate the frequency offset 1420 as a function of an initial symbol of the second PDCCH monitoring occasion 1415 (e.g., as a function of a location of the second PDCCH monitoring occasion 1415 within a slot 1425).

In some aspects, the frequency diversity configuration may indicate a specified number of PDCCH monitoring occasions per slot and the frequency offset 1420 may be associated with a specified monitoring occasion per slot. For example, as shown, the frequency offset 1420 may be associated with the second PDCCH monitoring occasion 1415 in each slot 1425. In some aspects, as shown, the frequency diversity configuration may indicate a specified number of PDCCH monitoring occasions 1410 and 1415 per aggregated monitoring occasion 1430. The frequency offset 1420 may be associated with a specified monitoring occasion 1415 per aggregated monitoring occasion 1430. For example, as shown, the frequency offset 1420 may be associated with the second monitoring occasions 1415 of the aggregated monitoring occasion 1430.

In some aspects, the frequency offset 1420 may be associated with a subset of a plurality of PDCCH monitoring occasions that contains the second PDCCH monitoring occasion and at least a third PDCCH monitoring occasion. For example, in some aspects, the frequency offset 1420 may be associated with the second and third PDCCH monitoring occasions of a plurality of PDCCH monitoring occasions.

As shown by reference number 1435, the base station 105 may transmit, and the UE 115 may receive, an activation indication. According to various aspects, the activation indication may be carried in a radio resource control (RRC) message configuration, a medium access control (MAC) control element (MAC-CE), UE-specific DCI, group-common DCI, and/or the like. As shown by reference number 1440, the activation indication may cause the UE 115 to activate the frequency diversity configuration. In some aspects, the activation indication may cause the UE 115 to activate the frequency diversity configuration directly or indirectly.

In some aspects, for example, the activation indication may include a PDCCH monitoring aggregation procedure activation indication. The UE 115 may activate a PDCCH monitoring aggregation procedure based at least in part on the PDCCH monitoring aggregation procedure activation indication. In some aspects, the UE 115 may activate the frequency diversity configuration based at least in part on activation of the PDCCH monitoring aggregation procedure. In some aspects, the activation indication may include a frequency diversity configuration activation indication. The UE 115 may activate the frequency diversity configuration based at least in part on the frequency diversity configuration activation indication.

As shown by reference number 1445, the UE 115 may monitor for the DCI in the search space associated with the plurality of PDCCH monitoring occasions based at least in part on the frequency diversity configuration. As shown by reference number 1450, the base station 105 may transmit, and the UE 115 may receive, the DCI. In some aspects, the base station 105 may transmit the DCI over the plurality of PDCCH monitoring occasions based at least in part on the frequency diversity configuration.

In some aspects, the UE 115 and/or the base station 105 may determine that a parameter satisfies a condition, and the UE 115 may perform the PDCCH monitoring based at least in part on the determination that the parameter satisfies the condition. In some aspects, the parameter may indicate a size of a CORESET (e.g., in a number of RBs, a number of orthogonal frequency division multiplexing (OFDM) symbols, and/or the like) associated with the search space, a size of a bandwidth (e.g., in number of RBs) associated with the search space, a frequency range associated with the search space, a subcarrier spacing associated with the search space, a search space type (e.g., a UE-specific search space, a common search space, and/or the like) associated with the search space, and/or the like.

Various aspects of the techniques and apparatuses described herein may facilitate providing diversity of frequency when utilizing a plurality of PDCCH monitoring occasions for transmitting repetitions of DCI. As a result, aspects may lead to more efficient implementation of enhanced coverage that may facilitate decreased blocking probability, decreased interference, and enhanced connection reliability.

As indicated above, FIG. 14 is provided as an example. Other examples may differ from what is described with respect to FIG. 14.

Figure 15:
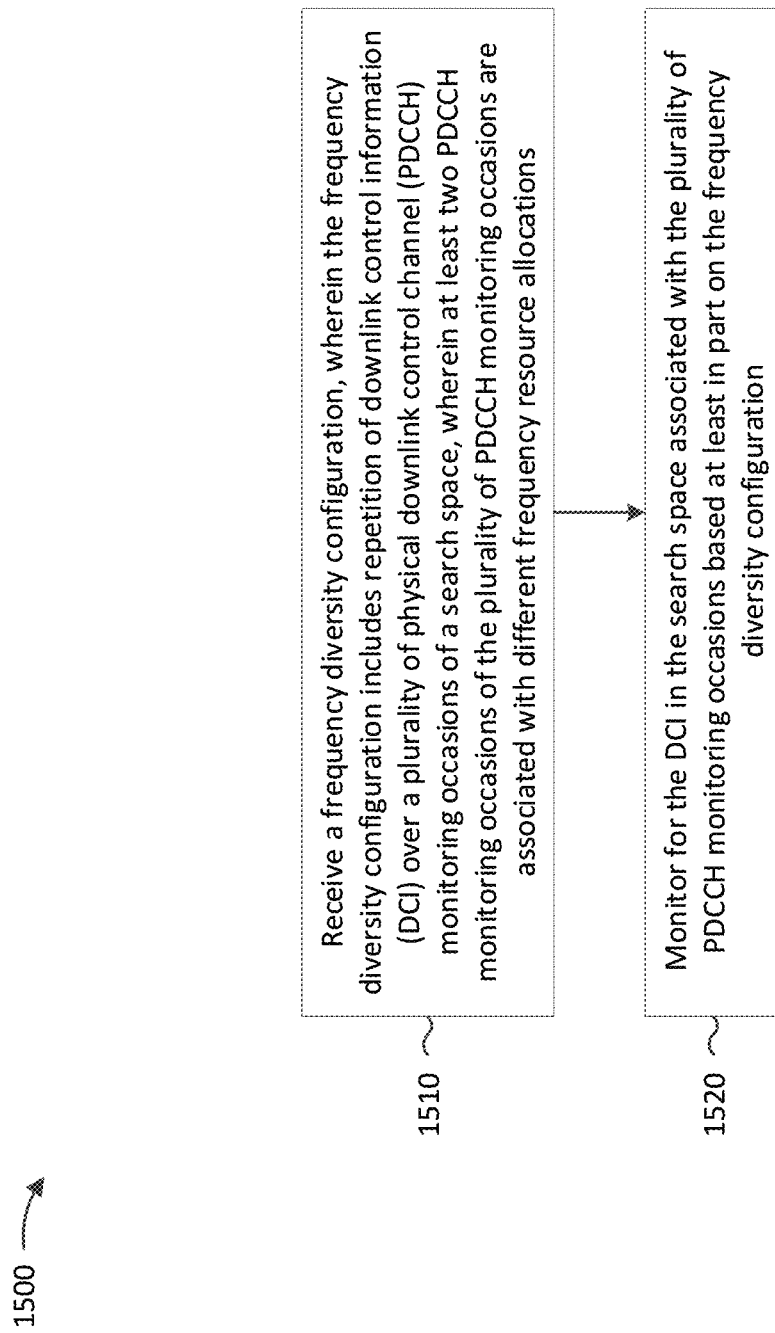
FIG. 15 illustrates a flow diagram of a wireless communication method according to some embodiments of the present disclosure.

FIG. 15 is a diagram illustrating an example process 1500 performed, for example, by a UE, in accordance with various aspects of the present disclosure. Example process 1500 is an example where the UE (e.g., UE 115 or 400 and/or the like) performs operations associated with techniques for PDCCH monitoring with frequency diversity.

As shown in FIG. 15, in some aspects, process 1500 may include receiving a frequency diversity configuration (which may be a monitoring configuration or be included within a monitoring configuration), wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations (block 1510). For example, the UE (e.g., using processor 402, memory 404, PDCCH monitor module 408, transceiver 410, and/or the like) may receive a frequency diversity configuration, as described above. In some aspects, the UE 115 may include means for receiving the frequency diversity configuration, such as transceiver 410, controller/processor 402, memory 404, PDCCH monitor module 408, or antennas 416. In some aspects, the frequency diversity configuration includes repetition of DCI over a plurality of PDCCH monitoring occasions of a search space. In some aspects, at least two PDCCH monitoring occasions of the plurality of PDCCH monitoring occasions are associated with different frequency resource allocations.

As further shown in FIG. 15, in some aspects, process 1500 may include monitoring for the DCI in the search space associated with the plurality of PDCCH monitoring occasions based at least in part on the frequency diversity configuration (block 1520). For example, the UE (e.g., using transceiver 410, controller/processor 402, memory 404, PDCCH monitor module 408, and/or the like) may monitor for the DCI in the search space associated with the plurality of PDCCH monitoring occasions based at least in part on the frequency diversity configuration, as described above. In some aspects, the UE 115 may include means for monitoring for the DCI, such as transceiver 410, controller/processor 402, memory 404, PDCCH monitor module 408 or antennas 416.

Process 1500 may include additional aspects, such as any single aspect or any combination of aspects described below and/or in connection with one or more other processes described elsewhere herein.

In a first aspect, the at least two PDCCH monitoring occasions are associated with different frequency resource allocations based at least in part on a PDCCH monitoring aggregation procedure.

In a second aspect, alone or in combination with the first aspect, process 1500 includes receiving an indication of a frequency offset associated with at least one PDCCH monitoring occasion of the at least two PDCCH monitoring occasions.

In a third aspect, alone or in combination with one or more of the first and second aspects, receiving an indication of the frequency offset comprises receiving an indication of a frequency allocation of a CORESET associated with the search space, where the frequency allocation of the CORESET indicates the frequency offset.

In a fourth aspect, alone or in combination with one or more of the first through third aspects, the frequency offset comprises a multiple of six RBs.

In a fifth aspect, alone or in combination with one or more of the first through fourth aspects, a first PDCCH monitoring occasion of the at least two PDCCH monitoring occasions is associated with a first frequency resource allocation, where a second PDCCH monitoring occasion of the at least two PDCCH monitoring occasions is associated with a second frequency resource allocation, and where the second frequency resource allocation indicates the frequency offset, wherein the indication of the frequency offset indicates the frequency offset as a function of an initial symbol of the second PDCCH monitoring occasion.

In a sixth aspect, alone or in combination with one or more of the first through fifth aspects, the frequency offset is associated with a subset of the plurality of PDCCH monitoring occasions that contains the second PDCCH monitoring occasion and at least a third PDCCH monitoring occasion.

In a seventh aspect, alone or in combination with one or more of the first through sixth aspects, the frequency diversity configuration indicates a specified number of PDCCH monitoring occasions per slot, and the frequency offset is associated with a specified monitoring occasion per slot.

In an eighth aspect, alone or in combination with one or more of the first through seventh aspects, the frequency diversity configuration indicates a specified number of PDCCH monitoring occasions per aggregated monitoring occasion, and the frequency offset is associated with a specified monitoring occasion per aggregated monitoring occasion.

In a ninth aspect, alone or in combination with one or more of the first through eighth aspects, process 1500 includes activating a PDCCH monitoring aggregation procedure; and activating the frequency diversity configuration based at least in part on the activation of the PDCCH monitoring aggregation procedure.

In a tenth aspect, alone or in combination with one or more of the first through ninth aspects, process 1500 includes receiving a PDCCH monitoring aggregation procedure activation indication, wherein the activation of the PDCCH monitoring aggregation procedure is based at least in part on the PDCCH monitoring aggregation procedure activation indication.

In an eleventh aspect, alone or in combination with one or more of the first through tenth aspects, the PDCCH monitoring aggregation procedure activation indication is carried in at least one of: an RRC message configuration, a MAC-CE, UE-specific DCI, group-common DCI, or a combination thereof.

In a twelfth aspect, alone or in combination with one or more of the first through eleventh aspects, process 1500 includes receiving a frequency diversity configuration activation indication; and activating the frequency diversity configuration based at least in part on the frequency diversity configuration activation indication.

In a thirteenth aspect, alone or in combination with one or more of the first through twelfth aspects, the frequency diversity configuration activation indication is carried in at least one of: an RRC message configuration, a MAC-CE, UE-specific DCI, group-common DCI, or a combination thereof.

In a fourteenth aspect, alone or in combination with one or more of the first through thirteenth aspects, process 1500 includes determining that a parameter satisfies a condition, wherein monitoring for the DCI in the search space associated with the plurality of PDCCH monitoring occasions based at least in part on the frequency diversity configuration is based at least in part on the determination that the parameter satisfies the condition.

In a fifteenth aspect, alone or in combination with one or more of the first through fourteenth aspects, the parameter indicates at least one of: a size of a CORESET associated with the search space, a size of a bandwidth associated with the search space, a frequency range associated with the search space, a subcarrier spacing associated with the search space, a search space type associated with the search space, or a combination thereof.

In a sixteenth aspect, alone or in combination with one or more of the first through fifteenth aspects, the size of the CORESET comprises at least one of: a number of RBs, a number of OFDM symbols, or a combination thereof.

In a seventeenth aspect, alone or in combination with one or more of the first through sixteenth aspects, the size of the bandwidth comprises a number of RBs.

In an eighteenth aspect, alone or in combination with one or more of the first through seventeenth aspects, the search space type comprises a UE-specific search space or a common search space.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
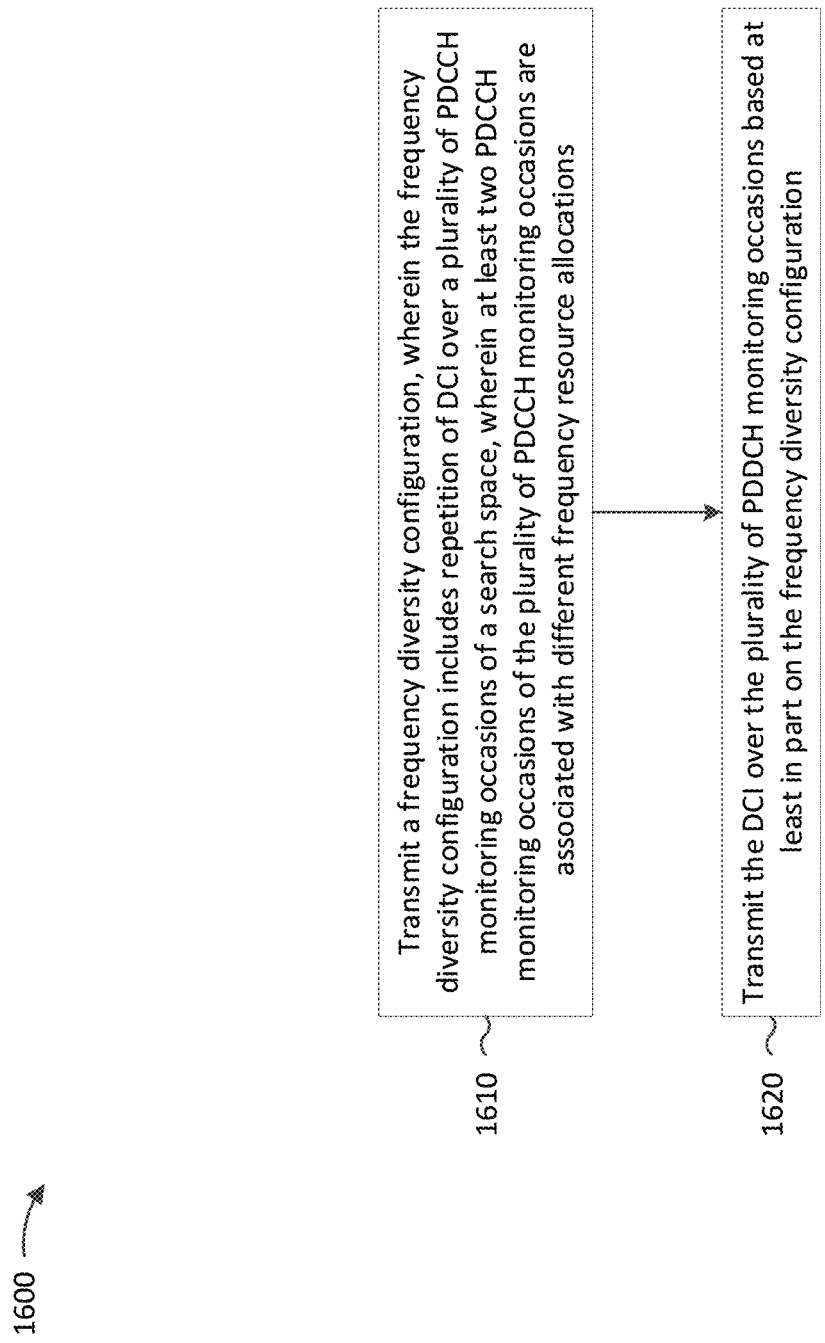
FIG. 16 illustrates a flow diagram of a wireless communication method according to some embodiments of the present disclosure.

FIG. 16 is a diagram illustrating an example process 1600 performed, for example, by a base station, in accordance with various aspects of the present disclosure. Example process 1600 is an example where the base station (e.g., base station 105, 500, and/or the like) performs operations associated with techniques for PDCCH monitoring with frequency diversity.

As shown in FIG. 16, in some aspects, process 1600 may include transmitting, to a UE 115, a frequency diversity configuration (Which may be a monitoring configuration or be included with a monitoring configuration), wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations (block 1610). For example, the base station (e.g., using transceiver 510, controller/processor 502, memory 504, and/or the like) may transmit, to a UE 115, a frequency diversity configuration, as described above. In some aspects, the base station 105 may include means for transmitting the frequency diversity configuration, such as controller/processor 502, transceiver 510, DL control channel module 508, or antennas 516. In some aspects, the frequency diversity configuration includes repetition of DCI over a plurality of PDCCH monitoring occasions of a search space. In some aspects, at least two PDCCH monitoring occasions of the plurality of PDCCH monitoring occasions are associated with different frequency resource allocations.

As further shown in FIG. 16, in some aspects, process 1600 may include transmitting the DCI over the plurality of PDCCH monitoring occasions based at least in part on the frequency diversity configuration (block 1620). For example, the base station (e.g., using transceiver 510, controller/processor 502, memory 504, DL control channel module 508 and/or the like) may transmit the DCI over the plurality of PDCCH monitoring occasions based at least in part on the frequency diversity configuration, as described above. In some aspects, the base station may include means for transmitting the DCI, such as controller/processor 502, transceiver 510, DL control channel module 508, or antennas 516.

Process 1600 may include additional aspects, such as any single aspect or any combination of aspects described below and/or in connection with one or more other processes described elsewhere herein.

In a first aspect, the at least two PDCCH monitoring occasions are associated with different frequency resource allocations based at least in part on a PDCCH monitoring aggregation procedure.

In a second aspect, alone or in combination with the first aspect, process 1600 includes transmitting an indication of a frequency offset associated with at least one PDCCH monitoring occasion of the at least two PDCCH monitoring occasions.

In a third aspect, alone or in combination with one or more of the first and second aspects, transmitting an indication of the frequency offset comprises transmitting an indication of a frequency allocation of a CORESET associated with the search space, the frequency allocation of the CORESET indicates the frequency offset.

In a fourth aspect, alone or in combination with one or more of the first through third aspects, the frequency offset comprises a multiple of six RBs.

In a fifth aspect, alone or in combination with one or more of the first through fourth aspects, a first PDCCH monitoring occasion of the at least two PDCCH monitoring occasions is associated with a first frequency resource allocation, and a second PDCCH monitoring occasion of the at least two PDCCH monitoring occasions is associated with a second frequency resource allocation.

In a sixth aspect, alone or in combination with one or more of the first through fifth aspects, the frequency offset is associated with a subset of the plurality of PDCCH monitoring occasions that contains the second PDCCH monitoring occasion and at least a third PDCCH monitoring occasion.

In a seventh aspect, alone or in combination with one or more of the first through sixth aspects, the frequency diversity configuration indicates a specified number of PDCCH monitoring occasions per slot, and the frequency offset is associated with a specified monitoring occasion per slot.

In an eighth aspect, alone or in combination with one or more of the first through seventh aspects, the frequency diversity configuration indicates a specified number of PDCCH monitoring occasions per aggregated monitoring occasion, and the frequency offset is associated with a specified monitoring occasion per aggregated monitoring occasion.

In a ninth aspect, alone or in combination with one or more of the first through eighth aspects, process 1600 includes transmitting a PDCCH monitoring aggregation procedure activation indication, wherein the PDCCH monitoring aggregation procedure activation indication is to cause activation of a PDCCH monitoring aggregation procedure, and wherein the frequency diversity configuration is activated based at least in part on the activation of the PDCCH monitoring aggregation procedure.

In a tenth aspect, alone or in combination with one or more of the first through ninth aspects, the PDCCH monitoring aggregation procedure activation indication is carried in at least one of: an RRC message configuration, a MAC-CE, UE-specific DCI, group-common DCI, or a combination thereof.

In an eleventh aspect, alone or in combination with one or more of the first through tenth aspects, process 1600 includes transmitting a frequency diversity configuration activation indication, where frequency diversity configuration activation indication is to cause activation of the frequency diversity configuration.

In a twelfth aspect, alone or in combination with one or more of the first through eleventh aspects, the frequency diversity configuration activation indication is carried in at least one of: an RRC message configuration, a MAC-CE, UE-specific DCI, group-common DCI, or a combination thereof.

In a thirteenth aspect, alone or in combination with one or more of the first through twelfth aspects, process 1600 includes determining that a parameter satisfies a condition, where monitoring for the DCI in the search space associated with the plurality of PDCCH monitoring occasions based at least in part on the frequency diversity configuration is based at least in part on the determination that the parameter satisfies the condition.

In a fourteenth aspect, alone or in combination with one or more of the first through thirteenth aspects, the parameter indicates at least one of: a size of a CORESET associated with the search space, a size of a bandwidth associated with the search space, a frequency range associated with the search space, a subcarrier spacing associated with the search space, a search space type associated with the search space, or a combination thereof.

In a fifteenth aspect, alone or in combination with one or more of the first through fourteenth aspects, the size of the CORESET comprises at least one of: a number of RBs, a number of OFDM symbols, or a combination thereof.

In a sixteenth aspect, alone or in combination with one or more of the first through fifteenth aspects, the size of the bandwidth comprises a number of RBs.

In a seventeenth aspect, alone or in combination with one or more of the first through sixteenth aspects, the search space type comprises a UE-specific search space or a common search space.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 is a diagram illustrating an example process 1700 performed, for example, by a UE, in accordance with various aspects of the present disclosure. Example process 1700 is an example where the UE (e.g., UE 115, 400, and/or the like) performs operations associated with techniques for hashing function perturbation for PDCCH monitoring aggregation.

As shown in FIG. 17, in some aspects, process 1700 may include receiving a monitoring configuration, wherein the monitoring configuration includes repetition of DCI over a plurality of PDCCH monitoring occasions of a search space, where the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof (block 1710). For example, the UE (e.g., using transceiver 410, controller/processor 402, memory 404, PDCCH monitor module 408, and/or the like) may receive a monitoring configuration, as described above. In some aspects, the UE 115 may include means for receiving the monitoring configuration, such as transceiver 410, controller/processor 402, memory 404, PDCCH monitor module 408, or antennas 416. In some aspects, the monitoring configuration includes repetition of DCI over a plurality of PDCCH monitoring occasions of a search space. In some aspects, the monitoring configuration indicates a plurality of hashing functions for identifying one or more CCE indexes of a set of PDCCH candidates of the search space. In some aspects, a hashing function of the plurality of hashing functions is dependent on at least one of a position of a corresponding PDCCH monitoring occasion of the plurality of PDCCH monitoring occasions, an index associated with the corresponding PDCCH monitoring occasion, or a combination thereof.

As further shown in FIG. 17, in some aspects, process 1700 may include monitoring for the DCI in the search space associated with the plurality of PDCCH monitoring occasions based at least in part on the hashing function (block 1720). For example, the UE 115 (e.g., using transceiver 410, controller/processor 402, memory 404, PDCCH monitor module 408, and/or the like) may monitor for the DCI in the search space associated with the plurality of PDCCH monitoring occasions based at least in part on the hashing function, as described above. In some aspects, the UE 115 may include means for monitoring for the DCI, such as transceiver 410, controller/processor 402, memory 404, PDCCH monitor module 408, or antennas 416.

Process 1700 may include additional aspects, such as any single aspect or any combination of aspects described below and/or in connection with one or more other processes described elsewhere herein.

In a first aspect, the hashing function is dependent on the position of the corresponding PDCCH monitoring occasion within a slot.

In a second aspect, alone or in combination with the first aspect, the hashing function comprises a main term multiplied by a modulo function, and the main term comprises the index associated with the corresponding PDCCH monitoring occasion.

In a third aspect, alone or in combination with one or more of the first and second aspects, the index associated with the corresponding PDCCH monitoring occasion comprises an index of an initial symbol of the corresponding PDCCH monitoring occasion, an index of the corresponding PDCCH monitoring occasion, or a combination thereof.

In a fourth aspect, alone or in combination with one or more of the first through third aspects, the main term comprises: a first term that includes a multiplicative factor multiplied by a first variable that is based at least in part on an RNTI associated with the UE, and a second term that is based at least in part on a number of PDCCH candidates in the set of PDCCH candidates.

In a fifth aspect, alone or in combination with one or more of the first through fourth aspects, the index associated with the corresponding PDCCH monitoring occasion is added to the first term and the second term.

In a sixth aspect, alone or in combination with one or more of the first through fifth aspects, the index associated with the corresponding PDCCH monitoring occasion is multiplied by the multiplicative factor.

In a seventh aspect, alone or in combination with one or more of the first through sixth aspects, process 1700 includes activating a PDCCH monitoring aggregation procedure and activating the hashing function based at least in part on the activation of the PDCCH monitoring aggregation procedure.

In an eighth aspect, alone or in combination with one or more of the first through seventh aspects, process 1700 includes receiving a PDCCH monitoring aggregation procedure activation indication, where the activation of the PDCCH monitoring aggregation procedure is based at least in part on the PDCCH monitoring aggregation procedure activation indication.

In a ninth aspect, alone or in combination with one or more of the first through eighth aspects, the PDCCH monitoring aggregation procedure activation indication is carried in at least one of an RRC message configuration, a MAC-CE, UE-specific DCI, group-common DCI, or a combination thereof.

In a tenth aspect, alone or in combination with one or more of the first through ninth aspects, process 1700 includes receiving a hashing function perturbation activation indication and activating the hashing function based at least in part on the hashing function perturbation activation indication.

In an eleventh aspect, alone or in combination with one or more of the first through tenth aspects, the hashing function perturbation activation indication is carried in at least one of an RRC message configuration, a MAC-CE, UE-specific DCI, group-common DCI, or a combination thereof.

In a twelfth aspect, alone or in combination with one or more of the first through eleventh aspects, process 1700 includes determining that a parameter satisfies a condition, where monitoring for the DCI in the search space associated with the plurality of PDCCH monitoring occasions based at least in part on the hashing function is based at least in part on the determination that the parameter satisfies the condition.

In a thirteenth aspect, alone or in combination with one or more of the first through twelfth aspects, the parameter indicates at least one of a size of a CORESET associated with the search space, a frequency range associated with the search space, a subcarrier spacing associated with the search space, or a combination thereof.

In a fourteenth aspect, alone or in combination with one or more of the first through thirteenth aspects, the size of the CORESET comprises at least one of a number of RBs, a number of OFDM symbols, or a combination thereof.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
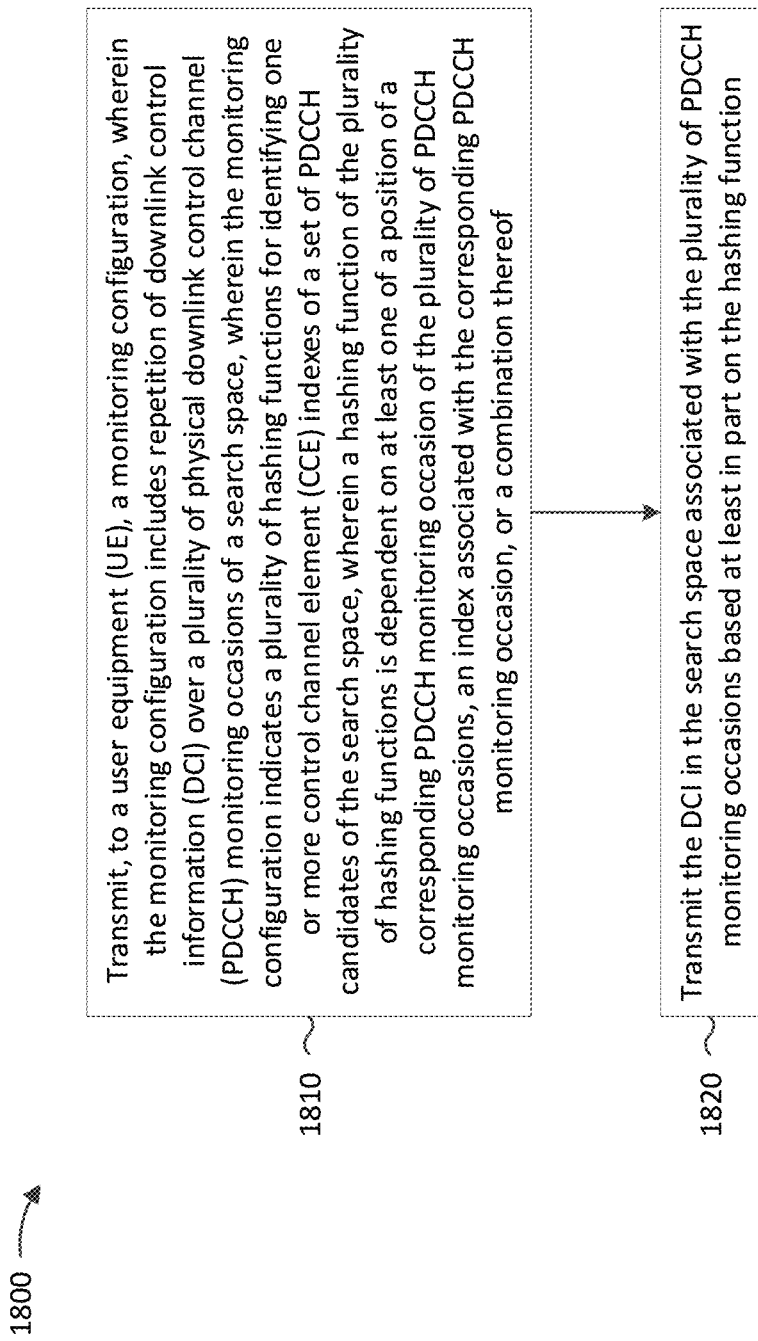
FIG. 18 illustrates a flow diagram of a wireless communication method according to some embodiments of the present disclosure.

FIG. 18 is a diagram illustrating an example process 1800 performed, for example, by a base station, in accordance with various aspects of the present disclosure. Example process 1800 is an example where the base station (e.g., base station 105, 500, and/or the like) performs operations associated with techniques for hashing function perturbation for PDCCH monitoring aggregation.

As shown in FIG. 18, in some aspects, process 1800 may include transmitting, to a UE 115, a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, and wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof (block 1810). For example, the base station 105 (e.g., using transceiver 510, controller/processor 502, memory 504, DL control channel module 508, and/or the like) may transmit, to a UE 115, a monitoring configuration, as described above. In some aspects, the base station 105 may include means for transmitting the monitoring configuration, such as controller/processor 502, transceiver 510, DL control channel module 508, or antennas 516. In some aspects, the monitoring configuration includes repetition of DCI over a plurality of PDCCH monitoring occasions of a search space. In some aspects, the monitoring configuration indicates a plurality of hashing functions for identifying one or more CCE indexes of a set of PDCCH candidates of the search space. In some aspects, a hashing function of the plurality of hashing functions is dependent on at least one of a position of a corresponding PDCCH monitoring occasion of the plurality of PDCCH monitoring occasions, an index associated with the corresponding PDCCH monitoring occasion, or a combination thereof.

As further shown in FIG. 18, in some aspects, process 1800 may include transmitting the DCI in the search space associated with the plurality of PDCCH monitoring occasions based at least in part on the hashing function (block 1820). For example, the base station 105 (e.g., using transceiver 510, controller/processor 502, memory 504, and/or the like) may transmit the DCI in the search space associated with the plurality of PDCCH monitoring occasions based at least in part on the hashing function, as described above. In some aspects, the base station may include means for transmitting the DCI, such as controller/processor 502, transceiver 510, DL control channel module 508, or antennas 516.

Process 1800 may include additional aspects, such as any single aspect or any combination of aspects described below and/or in connection with one or more other processes described elsewhere herein.

In a first aspect, the hashing function is dependent on the position of the corresponding PDCCH monitoring occasion within a slot.

In a second aspect, alone or in combination with the first aspect, the hashing function comprises a main term multiplied by a modulo function and the main term comprises the index associated with the corresponding PDCCH monitoring occasion.

In a third aspect, alone or in combination with one or more of the first and second aspects, the index associated with the corresponding PDCCH monitoring occasion comprises an index of an initial symbol of the corresponding PDCCH monitoring occasion, an index of the corresponding PDCCH monitoring occasion, or a combination thereof.

In a fourth aspect, alone or in combination with one or more of the first through third aspects, the main term comprises: a first term that includes a multiplicative factor multiplied by a first variable that is based at least in part on an RNTI associated with the UE, and a second term that is based at least in part on a number of PDCCH candidates in the set of PDCCH candidates.

In a fifth aspect, alone or in combination with one or more of the first through fourth aspects, the index associated with the corresponding PDCCH monitoring occasion is added to the first term and the second term.

In a sixth aspect, alone or in combination with one or more of the first through fifth aspects, the index associated with the corresponding PDCCH monitoring occasion is multiplied by the multiplicative factor.

In a seventh aspect, alone or in combination with one or more of the first through sixth aspects, process 1800 includes transmitting a PDCCH monitoring aggregation procedure activation indication, wherein the PDCCH monitoring aggregation procedure activation indication is to cause activation of the PDCCH monitoring aggregation procedure, and wherein the hashing function is activated based at least in part on the activation of the PDCCH monitoring aggregation procedure.

In an eighth aspect, alone or in combination with one or more of the first through seventh aspects, the PDCCH monitoring aggregation procedure activation indication is carried in at least one of an RRC message configuration, a MAC-CE, UE-specific DCI, group-common DCI, or a combination thereof.

In a ninth aspect, alone or in combination with one or more of the first through eighth aspects, process 1800 includes transmitting a hashing function perturbation activation indication, wherein the hashing function perturbation activation indication is to cause activation of the hashing function.

In a tenth aspect, alone or in combination with one or more of the first through ninth aspects, the hashing function perturbation activation indication is carried in at least one of an RRC message configuration, a MAC-CE, UE-specific DCI, group-common DCI, or a combination thereof.

In an eleventh aspect, alone or in combination with one or more of the first through tenth aspects, process 1800 includes determining that a parameter satisfies a condition, wherein monitoring for the DCI in the search space associated with the plurality of PDCCH monitoring occasions based at least in part on the hashing function is based at least in part on the determination that the parameter satisfies the condition.

In a twelfth aspect, alone or in combination with one or more of the first through eleventh aspects, the parameter indicates at least one of a size of a CORESET associated with the search space, a frequency range associated with the search space, a subcarrier spacing associated with the search space, or a combination thereof.

In a thirteenth aspect, alone or in combination with one or more of the first through twelfth aspects, the size of the CORESET comprises at least one of a number of RBs, a number of OFDM symbols, or a combination thereof.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

In some aspects, a method of wireless communication performed by a user equipment (UE) includes: receiving a frequency diversity configuration, wherein the frequency diversity configuration includes repetition of downlink control information (DCI) over a plurality of physical downlink control channel (PDCCH) monitoring occasions of a search space, wherein at least two PDCCH monitoring occasions of the plurality of PDCCH monitoring occasions are associated with different frequency resource allocations; and monitoring for the DCI in the search space associated with the plurality of PDCCH monitoring occasions based at least in part on the frequency diversity configuration.

In some aspects, a method of wireless communication performed by a base station includes: transmitting, to a UE, a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and transmitting the DCI over the plurality of PDCCH monitoring occasions based at least in part on the frequency diversity configuration.

In some aspects, a UE for wireless communication includes: a memory; and one or more processors operatively coupled to the memory, the memory and the one or more processors configured to: receive a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and monitor for the DCI in the search space associated with the plurality of PDCCH monitoring occasions based at least in part on the frequency diversity configuration.

In some aspects, a base station for wireless communication includes: a memory; and one or more processors operatively coupled to the memory, the memory and the one or more processors configured to: transmit, to a UE, a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and transmit the DCI over the plurality of PDCCH monitoring occasions based at least in part on the frequency diversity configuration.

In some aspects, a non-transitory computer-readable medium storing a set of instructions for wireless communication includes: one or more instructions that, when executed by one or more processors of a UE, cause the UE to: receive a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and monitor for the DCI in the search space associated with the plurality of PDCCH monitoring occasions based at least in part on the frequency diversity configuration.

In some aspects, a non-transitory computer-readable medium storing a set of instructions for wireless communication includes: one or more instructions that, when executed by one or more processors of a base station, cause the base station to: transmit, to a UE, a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and transmit the DCI over the plurality of PDCCH monitoring occasions based at least in part on the frequency diversity configuration.

In some aspects, an apparatus for wireless communication includes: means for receiving a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and means for monitoring for the DCI in the search space associated with the plurality of PDCCH monitoring occasions based at least in part on the frequency diversity configuration.

In some aspects, an apparatus for wireless communication includes: means for transmitting, to a UE, a frequency diversity configuration, wherein the frequency diversity configuration includes repetition of DCI over a plurality of PDCCH monitoring occasions of a search space, wherein at least two PDCCH monitoring occasions of the plurality of PDCCH monitoring occasions are associated with different frequency resource allocations; and means for transmitting the DCI over the plurality of PDCCH monitoring occasions based at least in part on the frequency diversity configuration.

In some aspects, a method of wireless communication performed by a user equipment (UE) includes: receiving a monitoring configuration, wherein the monitoring configuration includes repetition of downlink control information (DCI) over a plurality of physical downlink control channel (PDCCH) monitoring occasions of a search space, wherein the monitoring configuration indicates a plurality of hashing functions for identifying one or more control channel element (CCE) indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and monitoring for the DCI in the search space associated with the plurality of PDCCH monitoring occasions based at least in part on the hashing function.

In some aspects, a method of wireless communication performed by a base station includes: transmitting, to a UE, a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and transmitting the DCI in the search space associated with the plurality of PDCCH monitoring occasions based at least in part on the hashing function.

In some aspects, a UE for wireless communication includes: a memory; and one or more processors operatively coupled to the memory, the memory and the one or more processors configured to: receive a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and monitor for the DCI in the search space associated with the plurality of PDCCH monitoring occasions based at least in part on the hashing function.

In some aspects, a base station for wireless communication includes: a memory; and one or more processors operatively coupled to the memory, the memory and the one or more processors configured to: transmit, to a UE, a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and transmit the DCI in the search space associated with the plurality of PDCCH monitoring occasions based at least in part on the hashing function.

In some aspects, a non-transitory computer-readable medium storing a set of instructions for wireless communication includes: one or more instructions that, when executed by one or more processors of a UE, cause the UE to: receive a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and monitor for the DCI in the search space associated with the plurality of PDCCH monitoring occasions based at least in part on the hashing function.

In some aspects, a non-transitory computer-readable medium storing a set of instructions for wireless communication includes: one or more instructions that, when executed by one or more processors of a base station, cause the base station to: transmit, to a UE, a monitoring configuration, wherein the monitoring configuration includes repetition of DCI over a plurality PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and transmit the DCI in the search space associated with the plurality of PDCCH monitoring occasions based at least in part on the hashing function.

In some aspects, an apparatus for wireless communication includes: means for receiving a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and means for monitoring for the DCI in the search space associated with the plurality of PDCCH monitoring occasions based at least in part on the hashing function.

In some aspects, an apparatus for wireless communication includes: means for transmitting, to a UE, a monitoring configuration, wherein the monitoring configuration includes repetition of DCI over a plurality of PDCCH monitoring occasions of a search space, wherein the monitoring configuration indicates a plurality of hashing functions for identifying one or more CCE indexes of a set of PDCCH candidates of the search space, wherein a hashing function of the plurality of hashing functions is dependent on at least one of: a position of a corresponding PDCCH monitoring occasion of the plurality of PDCCH monitoring occasions, an index associated with the corresponding PDCCH monitoring occasion, or a combination thereof; and means for transmitting the DCI in the search space associated with the plurality of PDCCH monitoring occasions based at least in part on the hashing function.

In some aspects, a method of wireless communication includes receiving, by a user equipment (UE), a monitoring configuration specifying a first control resource set (CORESET) and a second CORESET corresponding to respective monitoring occasions from among a plurality of monitoring occasions, the first and second CORESETs being different from each other. The method further includes monitoring, by the UE based on the monitoring configuration, a search space comprising the plurality of monitoring occasions for a physical downlink control channel (PDCCH) transmission.

In some aspects, a method of wireless communication includes transmitting, by a base station (BS), a monitoring configuration specifying a first control resource set (CORESET) and a second CORESET corresponding to respective monitoring occasions from among a plurality of monitoring occasions, the first and second CORESETs being different from each other. The method further includes indicating, by the BS to the UE based on the monitoring configuration, to begin monitoring a search space comprising the plurality of monitoring occasions for a physical downlink control channel (PDCCH) transmission. The method further includes transmitting, by the BS to the UE, the PDCCH transmission in at least one of the first CORESET and the second CORESET.

In some aspects, a first wireless communications device includes a transceiver configured to receive a monitoring configuration from a second wireless communications device specifying a first control resource set (CORESET) and a second CORESET corresponding to respective monitoring occasions from among a plurality of monitoring occasions, the first and second CORESETs being different from each other. The wireless communications device further includes a transceiver configured to receive a monitoring configuration from a second wireless communications device specifying a first control resource set (CORESET) and a second CORESET corresponding to respective monitoring occasions from among a plurality of monitoring occasions, the first and second CORESETs being different from each other.

In some aspects, a first wireless communications device includes a transceiver configured to transmit a monitoring configuration to a second wireless communications device specifying a first control resource set (CORESET) and a second CORESET corresponding to respective monitoring occasions from among a plurality of monitoring occasions, the first and second CORESETs being different from each other. The transceiver is further configured to indicate to the second wireless communications device, based on the monitoring configuration, to begin monitoring a search space comprising the plurality of monitoring occasions for a physical downlink control channel (PDCCH) transmission. The transceiver is further configured to transmit the PDCCH transmission in at least one of the first CORESET and the second CORESET.

In some aspects, a non-transitory computer-readable medium having program code recorded thereon, the program code includes code for causing a first wireless communications device to receive a monitoring configuration from a second wireless communications device specifying a first control resource set (CORESET) and a second CORESET corresponding to respective monitoring occasions from among a plurality of monitoring occasions, the first and second CORESETs being different from each other. The non-transitory computer-readable medium further comprising code for causing the first wireless communications device to monitor, based on the monitoring configuration, a search space comprising the plurality of monitoring occasions for a physical downlink control channel (PDCCH) transmission.

In some aspects, a non-transitory computer-readable medium having program code recorded thereon, the program code includes code for causing a first wireless communications device to transmit to a second wireless communications device a monitoring configuration specifying a first control resource set (CORESET) and a second CORESET corresponding to respective monitoring occasions from among a plurality of monitoring occasions, the first and second CORESETs being different from each other. The non-transitory computer-readable medium further comprises code for causing the first wireless communications device to indicate, to the second wireless communications device based on the monitoring configuration, to begin monitoring a search space comprising the plurality of monitoring occasions for a physical downlink control channel (PDCCH) transmission. The non-transitory computer-readable medium further comprises code for causing the first wireless communications device to transmit the PDCCH transmission in at least one of the first CORESET and the second CORESET.

In some aspects, a first wireless communications device comprises means for receiving a monitoring configuration from a second wireless communications device specifying a first control resource set (CORESET) and a second CORESET corresponding to respective monitoring occasions from among a plurality of monitoring occasions, the first and second CORESETs being different from each other. The first wireless communications device further comprises means for monitoring, based on the monitoring configuration, a search space comprising the plurality of monitoring occasions for a physical downlink control channel (PDCCH) transmission.

In some aspects, a first wireless communications device comprises means for transmitting a monitoring configuration to a second wireless communications device specifying a first control resource set (CORESET) and a second CORESET corresponding to respective monitoring occasions from among a plurality of monitoring occasions, the first and second CORESETs being different from each other. The first wireless communications device further comprises means for indicating to the second wireless communications device, based on the monitoring configuration, to begin monitoring a search space comprising the plurality of monitoring occasions for a physical downlink control channel (PDCCH) transmission. The first wireless communications device further comprises means for transmitting to the second wireless communications device the PDCCH transmission in at least one of the first CORESET and the second CORESET.

Further aspects of the present disclosure include the following:

1. A method of wireless communication, comprising:
   receiving, by a user equipment (UE), a monitoring configuration, wherein the monitoring configuration includes repetition of downlink control information (DCI) over a plurality of physical downlink control channel (PDCCH) monitoring occasions of a search space and indicates a diversity parameter that introduces diversity between the plurality of PDCCH monitoring occasions; and
   monitoring, by the UE based on the monitoring configuration, for the DCI in the search space associated with the plurality of PDCCH monitoring occasions according to the diversity parameter.

2. The method of aspect 1 wherein the diversity parameter comprises at least one of:
   a frequency resource allocation difference between the plurality of PDCCH monitoring occasions;
   a control resource set (CORESET) allocation difference between the plurality of PDCCH monitoring occasions; or
   a different hashing function allocation between the plurality of PDCCH monitoring occasions, each hashing function used for identifying one or more control channel element (CCE) indexes of a set of PDCCH candidates of the search space and being dependent on a value associated with a corresponding PDCCH monitoring occasion from among the plurality of PDCCH monitoring occasions.

3. The method of any of aspects 1-2, wherein a first CORESET for a first PDCCH monitoring occasion of the plurality of PDCCH monitoring occasions is associated with a first frequency range and a second CORESET for a second PDCCH monitoring occasion of the plurality of PDCCH monitoring occasions is associated with a second frequency range, the first and second frequency ranges being different from each other.

4. The method of any of aspects 1-3, wherein a first CORESET for a first PDCCH monitoring occasion of the plurality of PDCCH monitoring occasions is associated with a first resource element group (REG) bundling and a second CORESET for a second PDCCH monitoring occasion of the plurality of PDCCH monitoring occasions is associated with a second REG bundling, the first and second REG bundlings being different from each other.

5. The method of any of aspects 1-4, wherein at least two PDCCH monitoring occasions of the plurality of PDCCH monitoring occasions are associated with different frequency resource allocations based at least in part on a PDCCH monitoring aggregation procedure.

6. The method of any of aspects 1-5, further comprising receiving an indication of a frequency offset associated with at least one PDCCH monitoring occasion of the plurality of PDCCH monitoring occasions.

7. The method of any of aspects 2-6, wherein the hashing function is dependent on at least one of:
   a position of a corresponding PDCCH monitoring occasion of the plurality of PDCCH monitoring occasions, or
   an index associated with the corresponding PDCCH monitoring occasion.

8. The method of any of aspects 2-7, wherein the hashing function is dependent on the position of the corresponding PDCCH monitoring occasion within a slot.

9. A method of wireless communication, comprising:
   transmitting, by a base station (BS), a monitoring configuration, wherein the monitoring configuration includes repetition of downlink control information (DCI) over a plurality of physical downlink control channel (PDCCH) monitoring occasions of a search space and indicates a diversity parameter that introduces diversity between the plurality of PDCCH monitoring occasions; and
   transmitting, by the BS based on the monitoring configuration, the DCI in the search space associated with the plurality of PDCCH monitoring occasions according to the diversity parameter.

10. The method of aspect 9 wherein the diversity parameter comprises at least one of:
    a frequency resource allocation difference between the plurality of PDCCH monitoring occasions;
    a control resource set (CORESET) allocation difference between the plurality of PDCCH monitoring occasions; or
    a different hashing function allocation between the plurality of PDCCH monitoring occasions, each hashing function used for identifying one or more control channel element (CCD) indexes of a set of PDCCH candidates of the search space and being dependent on a value associated with a corresponding PDCCH monitoring occasion from among the plurality of PDCCH monitoring occasions.

11. The method of any of aspects 9-10, wherein a first CORESET for a first PDCCH monitoring occasion of the plurality of PDCCH monitoring occasions is associated with a first frequency range and a second CORESET for a second PDCCH monitoring occasion of the plurality of PDCCH monitoring occasions is associated with a second frequency range, the first and second frequency ranges being different from each other.

12. The method of any of aspects 9-11, wherein a first CORESET for a first PDCCH monitoring occasion of the plurality of PDCCH monitoring occasions is associated with a first resource element group (REG) bundling and a second CORESET for a second PDCCH monitoring occasion of the plurality of PDCCH monitoring occasions is associated with a second REG bundling, the first and second REG bundlings being different from each other.

13. The method of any of aspects 9-12, wherein at least two PDCCH monitoring occasions of the plurality of PDCCH monitoring occasions are associated with different frequency resource allocations based at least in part on a PDCCH monitoring aggregation procedure.

14. The method of any of aspects 9-13, further comprising transmitting an indication of a frequency offset associated with at least one PDCCH monitoring occasion of the plurality of PDCCH monitoring occasions.

15. The method of any of aspects 10-14, wherein the hashing function is dependent on at least one of:

a position of a corresponding PDCCH monitoring occasion of the plurality of PDCCH monitoring occasions, or an index associated with the corresponding PDCCH monitoring occasion.

16. The method of any of aspects 10-15, wherein the hashing function is dependent on the position of the corresponding PDCCH monitoring occasion within a slot.

17. A user equipment (UE), comprising:
A transceiver configured to receive a monitoring configuration, wherein the monitoring configuration includes repetition of downlink control information (DCI) over a plurality of physical downlink control channel (PDCCH) monitoring occasions of a search space and indicates a diversity parameter that introduces diversity between the plurality of PDCCH monitoring occasions; and
A processor configured to monitor, based on the monitoring configuration, for the DCI in the search space associated with the plurality of PDCCH monitoring occasions according to the diversity parameter.

18. The UE of aspect 17 wherein the diversity parameter comprises at least one of:
a frequency resource allocation difference between the plurality of PDCCH monitoring occasions;
a control resource set (CORESET) allocation difference between the plurality of PDCCH monitoring occasions; or
a different hashing function allocation between the plurality of PDCCH monitoring occasions, each hashing function used for identifying one or more control channel element (CCD) indexes of a set of PDCCH candidates of the search space and being dependent on a value associated with a corresponding PDCCH monitoring occasion from among the plurality of PDCCH monitoring occasions.

19. The UE of any of aspects 17-18, wherein a first CORESET for a first PDCCH monitoring occasion of the plurality of PDCCH monitoring occasions is associated with a first frequency range and a second CORESET for a second PDCCH monitoring occasion of the plurality of PDCCH monitoring occasions is associated with a second frequency range, the first and second frequency ranges being different from each other.

20. The UE of any of aspects 17-19, wherein a first CORESET for a first PDCCH monitoring occasion of the plurality of PDCCH monitoring occasions is associated with a first resource element group (REG) bundling and a second CORESET for a second PDCCH monitoring occasion of the plurality of PDCCH monitoring occasions is associated with a second REG bundling, the first and second REG bundlings being different from each other.

21. The UE of any of aspects 17-20, wherein at least two PDCCH monitoring occasions of the plurality of PDCCH monitoring occasions are associated with different frequency resource allocations based at least in part on a PDCCH monitoring aggregation procedure.

22. The UE of any of aspects 17-21, the transceiver further configured to receive an indication of a frequency offset associated with at least one PDCCH monitoring occasion of the plurality of PDCCH monitoring occasions.

23. The UE of aspects 18-22, wherein the hashing function is dependent on at least one of:
a position of a corresponding PDCCH monitoring occasion of the plurality of PDCCH monitoring occasions, or an index associated with the corresponding PDCCH monitoring occasion.

24. A base station (BS), comprising:
A transceiver configured to:
transmit a monitoring configuration, wherein the monitoring configuration includes repetition of downlink control information (DCI) over a plurality of physical downlink control channel (PDCCH) monitoring occasions of a search space and indicates a diversity parameter that introduces diversity between the plurality of PDCCH monitoring occasions; and
transmit, on the monitoring configuration, the DCI in the search space associated with the plurality of PDCCH monitoring occasions according to the diversity parameter.

25. The BS of aspect 24 wherein the diversity parameter comprises at least one of:
a frequency resource allocation difference between the plurality of PDCCH monitoring occasions;
a control resource set (CORESET) allocation difference between the plurality of PDCCH monitoring occasions; or
a different hashing function allocation between the plurality of PDCCH monitoring occasions, each hashing function used for identifying one or more control channel element (CCD) indexes of a set of PDCCH candidates of the search space and being dependent on a value associated with a corresponding PDCCH monitoring occasion from among the plurality of PDCCH monitoring occasions.

26. The BS of any of aspects 24-25, wherein a first CORESET for a first PDCCH monitoring occasion of the plurality of PDCCH monitoring occasions is associated with a first frequency range and a second CORESET for a second PDCCH monitoring occasion of the plurality of PDCCH monitoring occasions is associated with a second frequency range, the first and second frequency ranges being different from each other.

27. The BS of any of aspects 24-26, wherein a first CORESET for a first PDCCH monitoring occasion of the plurality of PDCCH monitoring occasions is associated with a first resource element group (REG) bundling and a second CORESET for a second PDCCH monitoring occasion of the plurality of PDCCH monitoring occasions is associated with a second REG bundling, the first and second REG bundlings being different from each other.

28. The BS of any of aspects 24-27, wherein at least two PDCCH monitoring occasions of the plurality of PDCCH monitoring occasions are associated with different frequency resource allocations based at least in part on a PDCCH monitoring aggregation procedure.

29. The BS of any of aspects 24-28, the transceiver further configured to transmit an indication of a frequency offset associated with at least one PDCCH monitoring occasion of the plurality of PDCCH monitoring occasions.

30. The BS of any of aspects 25-29, wherein the hashing function is dependent on at least one of:
a position of a corresponding PDCCH monitoring occasion of the plurality of PDCCH monitoring occasions, or an index associated with the corresponding PDCCH monitoring occasion.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE), a monitoring configuration specifying at least a first control resource set (CORESET) and a second CORESET different from the first CORESET, wherein the first CORESET corresponds to a first physical downlink control channel (PDCCH) monitoring occasion and the second CORESET corresponds to a second PDCCH monitoring occasion different from the first PDCCH monitoring occasion, the first PDCCH monitoring occasion and the second PDCCH monitoring occasion being within a same search space, and wherein the first CORESET is associated with a first transmission control information (TCI) state and the second CORESET is associated with a second TCI state different from the first TCI state; and
monitoring, by the UE based on the monitoring configuration, for a downlink control information (DCI) in the same search space associated with the first and second PDCCH monitoring occasions.

2. The method of claim 1, wherein the monitoring configuration further includes a diversity parameter comprising at least one of:
a frequency resource allocation difference between the first and second PDCCH monitoring occasions; or
a different hashing function allocation between the first and second PDCCH monitoring occasions, each hashing function used for identifying one or more control channel element (CCE) indexes of a set of PDCCH candidates of the same search space and being dependent on a value associated with a corresponding PDCCH monitoring occasion from among the first and second PDCCH monitoring occasions.

3. The method of claim 2, wherein the first CORESET corresponding to the first PDCCH monitoring occasion is associated with a first frequency range and the second CORESET corresponding to the second PDCCH monitoring occasion is associated with a second frequency range, the first and second frequency ranges being different from each other.

4. The method of claim 2, wherein the first CORESET corresponding to the first PDCCH monitoring occasion is associated with a first resource element group (REG) bundling and the second CORESET corresponding to the second PDCCH monitoring occasion is associated with a second REG bundling, the first and second REG bundlings being different from each other.

5. The method of claim 2, wherein at least the first and second PDCCH monitoring occasions are associated with the different frequency resource allocations based at least in part on a PDCCH monitoring aggregation procedure.

6. The method of claim 2, further comprising receiving an indication of a frequency offset associated with at least one PDCCH monitoring occasion within the same search space.

7. The method of claim 2, wherein the hashing function is dependent on at least one of:
a position of a corresponding PDCCH monitoring occasion within a slot, or
an index associated with the corresponding PDCCH monitoring occasion.

8. A method of wireless communication, comprising:
transmitting, by a base station (BS), a monitoring configuration specifying at least a first control resource set (CORESET) and a second CORESET different from the first CORESET, wherein the first CORESET corresponds to a first physical downlink control channel (PDCCH) monitoring occasion and the second CORESET corresponds to a second PDCCH monitoring occasion different from the first PDCCH monitoring occasion, the first PDCCH monitoring occasion and the second PDCCH monitoring occasion being within a same search space, and wherein the first CORESET is associated with a first transmission control information (TCI) state and the second CORESET is associated with a second TCI state different from the first TCI state; and
transmitting, by the BS based on the monitoring configuration, a downlink control information (DCI) in the same search space associated with the first and second PDCCH monitoring occasions.

9. The method of claim 8, wherein the monitoring configuration further includes a diversity parameter comprising at least one of:
a frequency resource allocation difference between the first and second PDCCH monitoring occasions; or a different hashing function allocation between the first and second PDCCH monitoring occasions, each hashing function used for identifying one or more control channel element (CCD) indexes of a set of PDCCH candidates of the same search space and being dependent on a value associated with a corresponding PDCCH monitoring occasion from among the first and second PDCCH monitoring occasions.

10. The method of claim 9, wherein the first CORESET corresponding to the first PDCCH monitoring occasion is associated with a first frequency range and the second CORESET corresponding to the second PDCCH monitoring occasion is associated with a second frequency range, the first and second frequency ranges being different from each other.

11. The method of claim 9, wherein the first CORESET corresponding to the first PDCCH monitoring occasion is associated with a first resource element group (REG) bundling and the second CORESET corresponding to the second PDCCH monitoring occasion is associated with a second REG bundling, the first and second REG bundlings being different from each other.

12. The method of claim 9, wherein at least the first and second PDCCH monitoring occasions are associated with the different frequency resource allocations based at least in part on a PDCCH monitoring aggregation procedure.

13. The method of claim 9, further comprising transmitting an indication of a frequency offset associated with at least one PDCCH monitoring occasion of the same search space.

14. The method of claim 9, wherein the hashing function is dependent on at least one of:
a position of a corresponding PDCCH monitoring occasion within a slot, or
an index associated with the corresponding PDCCH monitoring occasion.

15. A user equipment (UE), comprising:
A transceiver configured to receive a monitoring configuration specifying at least a first control resource set (CORESET) and a second CORESET different from the first CORESET, wherein the first CORESET corresponds to a first physical downlink control channel (PDCCH) monitoring occasion and the second CORESET corresponds to a second PDCCH monitoring occasion different from the first PDCCH monitoring occasion, the first PDCCH monitoring occasion and the second PDCCH monitoring occasion being within a same search space, and wherein the first CORESET is associated with a first transmission control information (TCI) state and the second CORESET is associated with a second TCI state different from the first TCI state; and
A processor configured to monitor, based on the monitoring configuration, for a downlink control information (DCI) in the same search space associated with the first and second PDCCH monitoring occasions.

16. The UE of claim 15, wherein the monitoring configuration further includes a diversity parameter comprising at least one of:
a frequency resource allocation difference between the first and second PDCCH monitoring occasions; or
a different hashing function allocation between the first and second PDCCH monitoring occasions, each hashing function used for identifying one or more control channel element (CCD) indexes of a set of PDCCH candidates of the same search space and being dependent on a value associated with a corresponding PDCCH monitoring occasion from among the first and second PDCCH monitoring occasions.

17. The UE of claim 16, wherein the first CORESET corresponding to the first PDCCH monitoring occasion is associated with a first frequency range and the second CORESET corresponding to the second PDCCH monitoring occasion is associated with a second frequency range, the first and second frequency ranges being different from each other.

18. The UE of claim 16, wherein the first CORESET corresponding to the first PDCCH monitoring occasion is associated with a first resource element group (REG) bundling and the second CORESET corresponding to the second PDCCH monitoring occasion is associated with a second REG bundling, the first and second REG bundlings being different from each other.

19. The UE of claim 16, wherein at least the first and second PDCCH monitoring occasions are associated with the different frequency resource allocations based at least in part on a PDCCH monitoring aggregation procedure.

20. The UE of claim 16, the transceiver further configured to receive an indication of a frequency offset associated with at least one PDCCH monitoring occasion of the same search space.

21. The UE of claim 16, wherein the hashing function is dependent on at least one of:
a position of a corresponding PDCCH monitoring occasion within a slot, or
an index associated with the corresponding PDCCH monitoring occasion.

22. A base station (BS), comprising:
A transceiver configured to:
transmit a monitoring configuration specifying at least a first control resource set (CORESET) and a second CORESET different from the first CORESET, wherein the first CORESET corresponds to a first physical downlink control channel (PDCCH) monitoring occasion and the second CORESET corresponds to a second PDCCH monitoring occasion different from the first PDCCH monitoring occasion, the first PDCCH monitoring occasion and the second PDCCH monitoring occasion being within a same search space, and wherein the first CORESET is associated with a first transmission control information (TCI) state and the second CORESET is associated with a second TCI state different from the first TCI state; and
transmit, based on the monitoring configuration, a downlink control information (DCI) in the same search space associated with the first and second PDCCH monitoring occasions.

23. The BS of claim 22, wherein the monitoring configuration further includes a diversity parameter comprising at least one of:
a frequency resource allocation difference between the first and second PDCCH monitoring occasions; or
a different hashing function allocation between the first and second PDCCH monitoring occasions, each hashing function used for identifying one or more control channel element (CCD) indexes of a set of PDCCH candidates of the same search space and being dependent on a value associated with a corresponding PDCCH monitoring occasion from among the first and second PDCCH monitoring occasions.

24. The BS of claim 23, wherein the first CORESET corresponding to the first PDCCH monitoring occasion is associated with a first frequency range and the second CORESET corresponding to the second PDCCH monitoring occasion is associated with a second frequency range, the first and second frequency ranges being different from each other.

25. The BS of claim 23, wherein the first CORESET corresponding to the first PDCCH monitoring occasion is associated with a first resource element group (REG) bundling and the second CORESET corresponding to the second PDCCH monitoring occasion is associated with a second REG bundling, the first and second REG bundlings being different from each other.

26. The BS of claim 23, wherein at least the first and second PDCCH monitoring occasions are associated with the different frequency resource allocations based at least in part on a PDCCH monitoring aggregation procedure.

27. The BS of claim 23, the transceiver further configured to transmit an indication of a frequency offset associated with at least one PDCCH monitoring occasion of the same search space.

28. The BS of claim 23, wherein the hashing function is dependent on at least one of:
- a position of a corresponding PDCCH monitoring occasion within a slot, or
- an index associated with the corresponding PDCCH monitoring occasion.

* * * * *